United States Patent [19]

Obikane et al.

[11] Patent Number: 5,504,530
[45] Date of Patent: Apr. 2, 1996

[54] APPARATUS AND METHOD FOR CODING AND DECODING IMAGE SIGNALS

[75] Inventors: Nobuhisa Obikane, Chiba; Katsumi Tahara, Kanagawa; Yoichi Yagasaki, Kanagawa; Jun Yonemitsu, Kanagawa; Teruhiko Suzuki, Chiba, all of Japan

[73] Assignee: Sony Corporation, Tokyo, Japan

[21] Appl. No.: 83,057

[22] Filed: Jun. 25, 1993

[30] Foreign Application Priority Data

Jun. 25, 1992 [JP] Japan .................... 4-191576
Oct. 26, 1992 [JP] Japan .................... 4-287179

[51] Int. Cl.⁶ ............................................. H04N 7/50
[52] U.S. Cl. .................... 348/413; 348/420; 348/426; 348/699
[58] Field of Search .......................... 348/403, 408, 348/420, 426, 437, 438, 413, 699; H04N 7/133, 7/137

[56] References Cited

U.S. PATENT DOCUMENTS

| | | | |
|---|---|---|---|
| 5,049,992 | 9/1991 | Citta et al. | 348/420 |
| 5,055,927 | 10/1991 | Keesen et al. | 348/437 |
| 5,128,791 | 7/1992 | LeGall et al. | 348/426 |
| 5,155,593 | 10/1992 | Yonemitsu et al. | |
| 5,196,933 | 3/1993 | Henot | 348/438 |
| 5,235,421 | 8/1993 | Yang | 348/426 |

FOREIGN PATENT DOCUMENTS

| | | |
|---|---|---|
| 0535272 | 4/1993 | European Pat. Off. |
| 3-114384 | 5/1991 | Japan .......... H04N 7/137 |
| WO92/06563 | 4/1992 | WIPO . |

OTHER PUBLICATIONS

International Organisation for Standardisation, ISO–IEC/JTC1/SC29/WG11; "Coded Representation of Picture and Audio Information: Test Model 5"; document AVC–491b, Version 2; Apr., 1993.

Signal Processing Of HDTV, 4 Sep. 1991, TURIN, IT pp. 353–360, XP000379972 Dufour et al 'A HDTV compatible coding scheme for distribution purposes' p. 353, par.2–p. 356, par. 5, figures 1–2, 4.

Signal Processing. Image Communication vol. 4, No. 4/5, Aug. 1992, Amsterdam NL pp. 325–344, XP000293752 Tuortier et al. 'Motion compensated subband coding schemes for compatible high definition TV coding' p. 332, left column, par. 3–right column, par. 4 p. 338, right column, par. 2–p. 342, left column, par. 3 figures 8, 9.

Primary Examiner—Tommy P. Chin
Assistant Examiner—Richard Lee
Attorney, Agent, or Firm—William S. Frommer; Alvin Sinderbrand

[57] ABSTRACT

A compression-coded high definition television signal is decoded and converted to a standard NTSC signal without loss of interlacing so that the resulting picture exhibits smooth motion. The compression-coding of the HDTV signal includes DCT processing to produce an 8×8 block of coefficient data. Upon decoding, the upper left quadrant of the coefficient data array is used to form a 4×4 subblock of coefficient data but the last row of elements of the subblock is replaced by corresponding elements of the eighth row of the 8×8 block of coefficient data.

21 Claims, 29 Drawing Sheets

FIG. I(C)
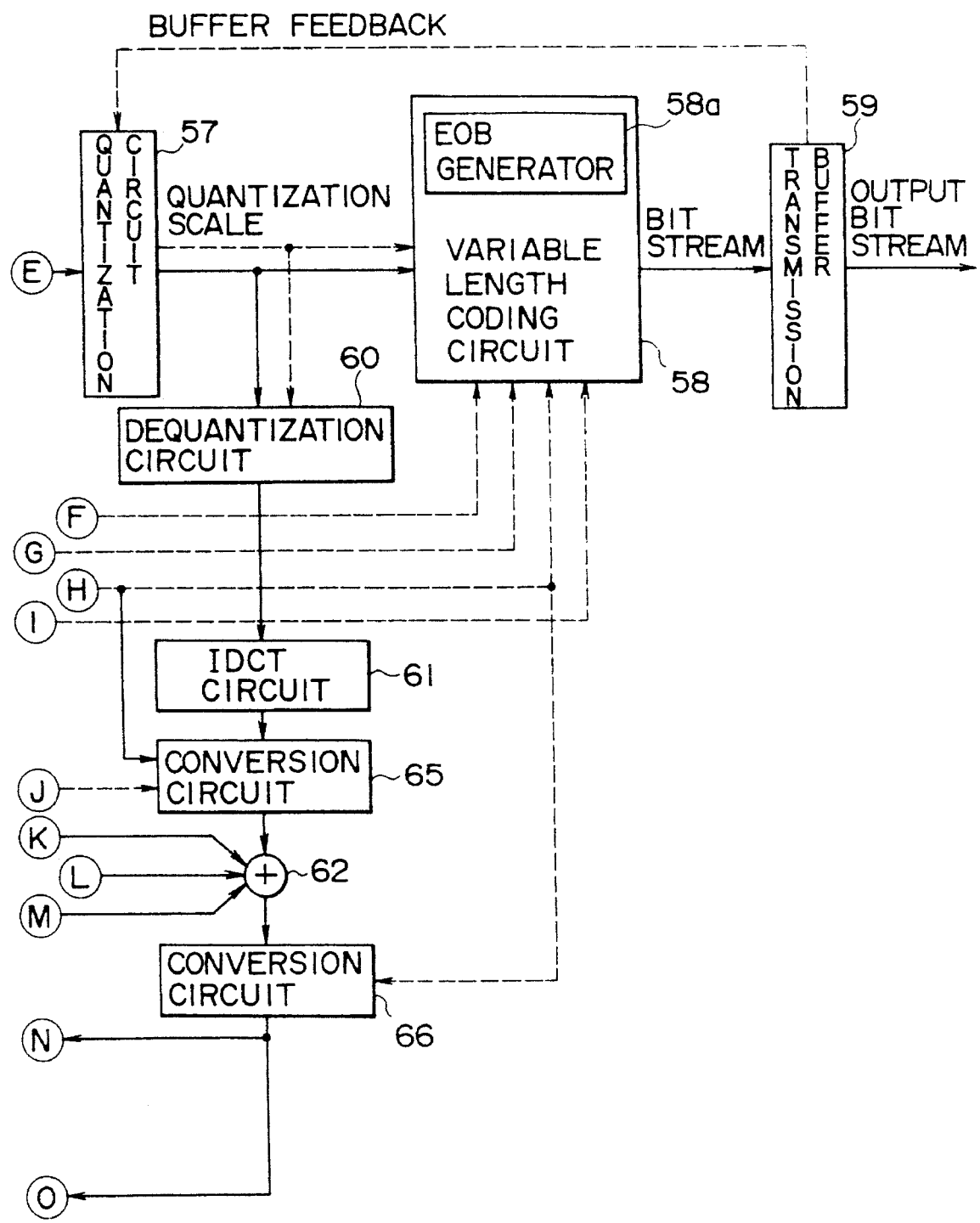

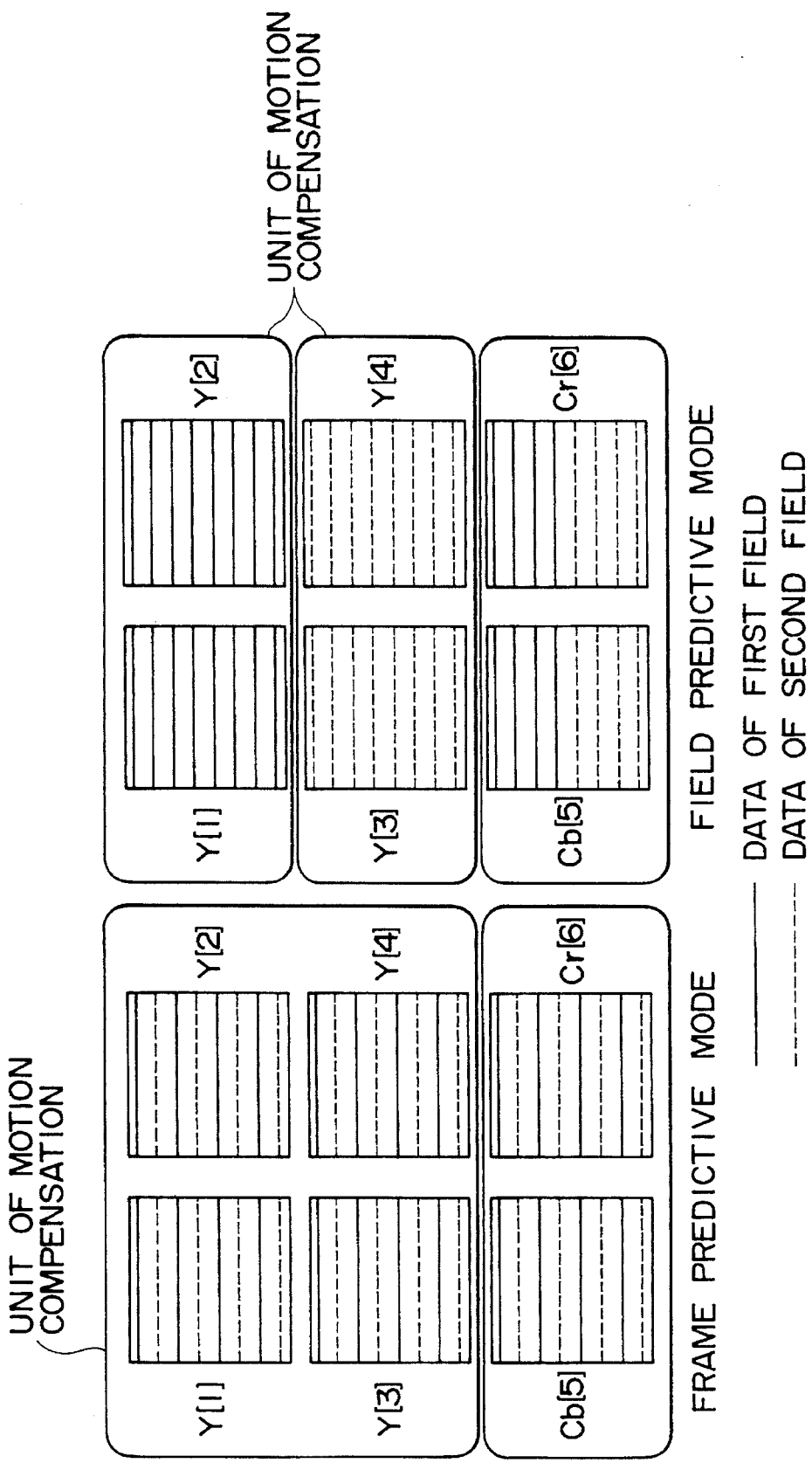

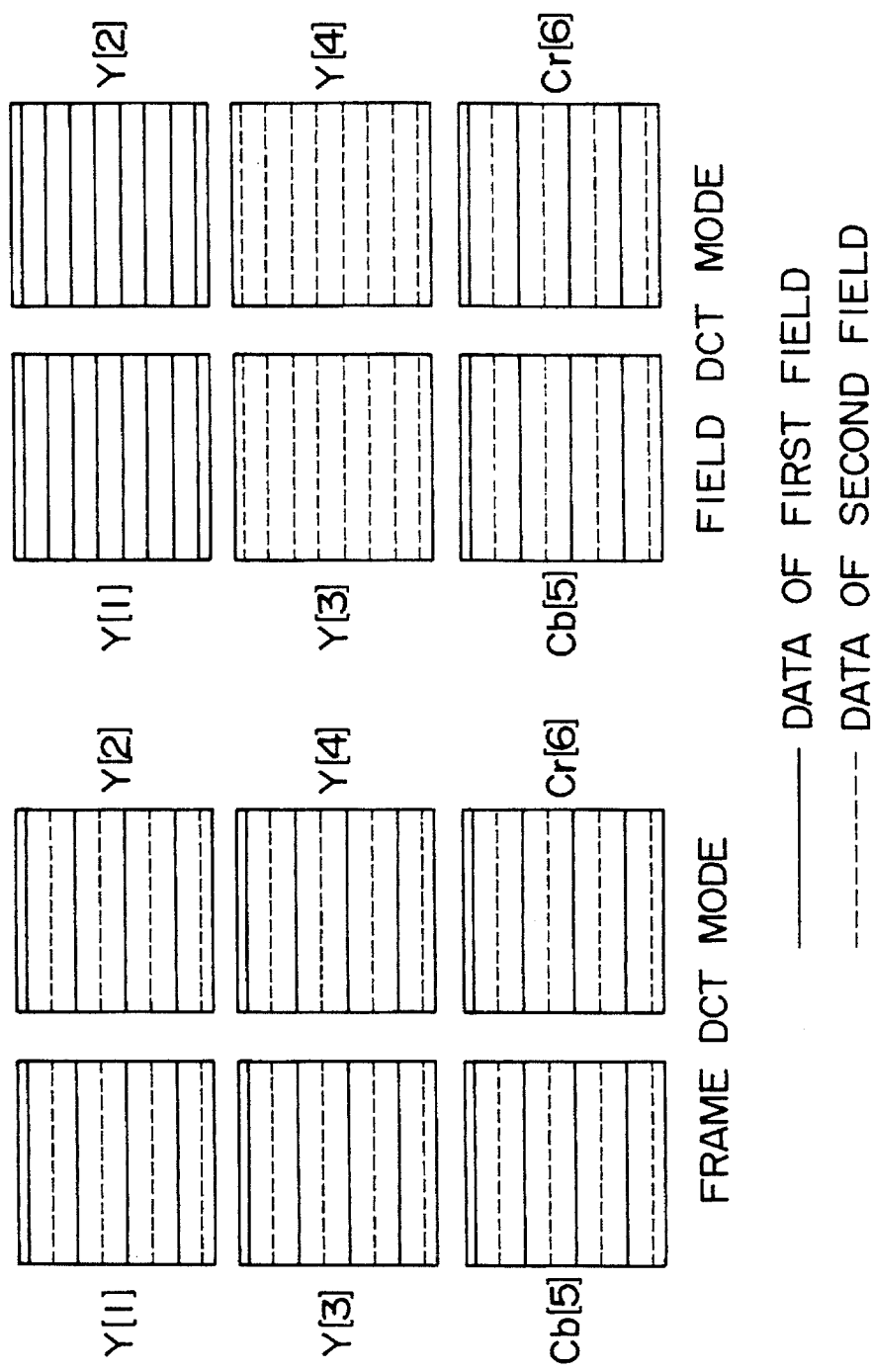

FIG. 4

| d(0,0) | d(0,1) | d(0,2) | d(0,3) | d(0,4) | d(0,5) | d(0,6) | d(0,7) |
|---|---|---|---|---|---|---|---|
| d(1,0) | d(1,1) | d(1,2) | d(1,3) | d(1,4) | d(1,5) | d(1,6) | d(1,7) |
| d(2,0) | d(2,1) | d(2,2) | d(2,3) | d(2,4) | d(2,5) | d(2,6) | d(2,7) |
| d(3,0) | d(3,1) | d(3,2) | d(3,3) | d(3,4) | d(3,5) | d(3,6) | d(3,7) |
| d(4,0) | d(4,1) | d(4,2) | d(4,3) | d(4,4) | d(4,5) | d(4,6) | d(4,7) |
| d(5,0) | d(5,1) | d(5,2) | d(5,3) | d(5,4) | d(5,5) | d(5,6) | d(5,7) |
| d(6,0) | d(6,1) | d(6,2) | d(6,3) | d(6,4) | d(6,5) | d(6,6) | d(6,7) |
| d(7,0) | d(7,1) | d(7,2) | d(7,3) | d(7,4) | d(7,5) | d(7,6) | d(7,7) |

FIG. 5

| 1 | 2 | 6 | 7 | 15 | 16 | 28 | 29 |
|---|---|---|---|----|----|----|----|
| 3 | 5 | 8 | 14 | 17 | 27 | 30 | 43 |
| 4 | 9 | 13 | 18 | 26 | 31 | 42 | 44 |
| 10 | 12 | 19 | 25 | 32 | 41 | 45 | 54 |
| 11 | 20 | 24 | 33 | 40 | 46 | 53 | 55 |
| 21 | 23 | 34 | 39 | 47 | 52 | 56 | 61 |
| 22 | 35 | 38 | 48 | 51 | 57 | 60 | 62 |
| 36 | 37 | 49 | 50 | 58 | 59 | 63 | 64 |

ZIGZAG SCAN

F I G. 7
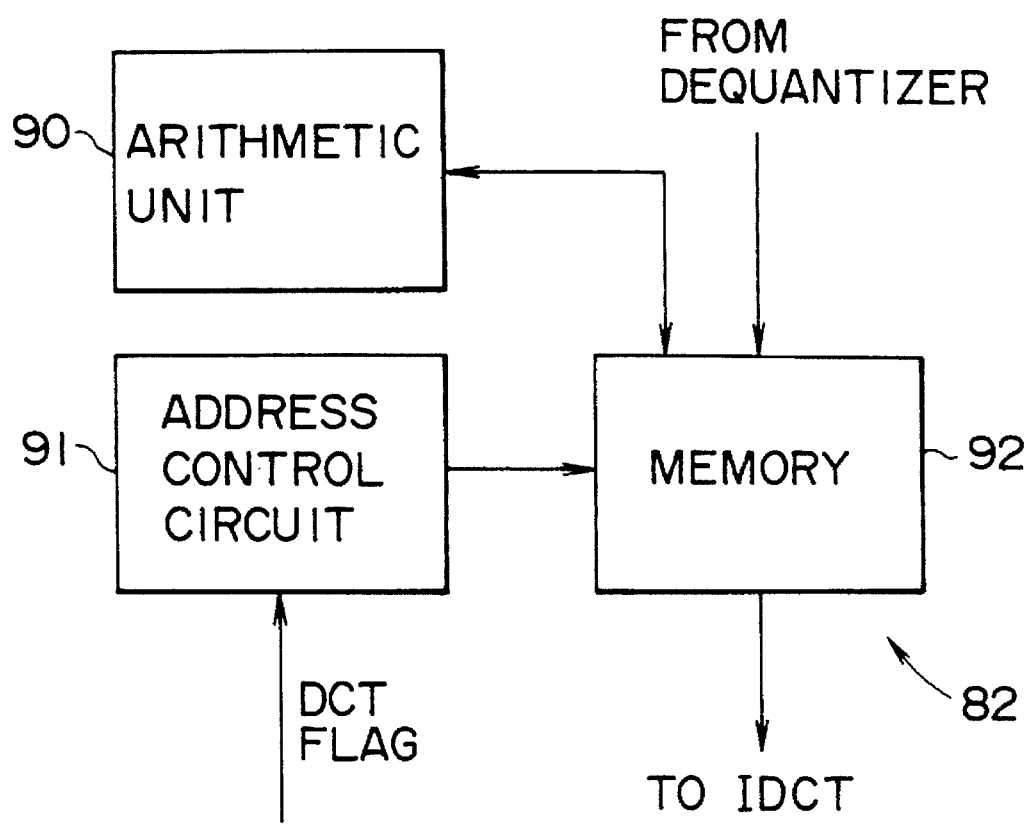

FIG. 12

| d(0,0) | d(0,1) | d(0,2) | d(0,3) |
|---|---|---|---|
| d(1,0) | d(1,1) | d(1,2) | d(1,3) |
| d(2,0) | d(2,1) | d(2,2) | d(2,3) |
| d(3,0) | d(3,1) | d(3,2) | d(3,3) |

FIG. 13

| d(0,0) | d(0,1) | d(0,2) | d(0,3) |
|---|---|---|---|
| d(1,0) | d(1,1) | d(1,2) | d(1,3) |
| d(2,0) | d(2,1) | d(2,2) | d(2,3) |
| d(3,0)+d(7,0) | d(3,1)+d(7,1) | d(3,2)+d(7,2) | d(3,3)+d(7,3) |

FIG. 14

| d(0,0) | d(0,1) | d(0,2) | d(0,3) |
|--------|--------|--------|--------|
| d(1,0) | d(1,1) | d(1,2) | d(1,3) |
| d(2,0) | d(2,1) | d(2,2) | d(2,3) |
| d(7,0) | d(7,1) | d(7,2) | d(7,3) |

FIG. 15

| d(0,0) | d(0,1) | d(0,2) | d(0,3) |
|--------|--------|--------|--------|
| d(1,0) | d(1,1) | d(1,2) | d(1,3) |
| d(6,0) | d(6,1) | d(6,2) | d(6,3) |
| d(7,0) | d(7,1) | d(7,2) | d(7,3) |

FIG. 16

| 1 | 2 | 6 | 7 | 26 | 27 | 35 | 36 |
|---|---|---|---|----|----|----|----|
| 3 | 5 | 8 | 13 | 28 | 34 | 37 | 46 |
| 4 | 9 | 12 | 14 | 33 | 38 | 45 | 47 |
| 10 | 11 | 15 | 16 | 39 | 44 | 48 | 54 |
| 25 | 29 | 32 | 40 | 43 | 49 | 53 | 55 |
| 30 | 31 | 41 | 42 | 50 | 52 | 56 | 61 |
| 21 | 22 | 23 | 24 | 51 | 57 | 60 | 62 |
| 17 | 18 | 19 | 20 | 58 | 59 | 63 | 64 |

ZIGZAG SCAN

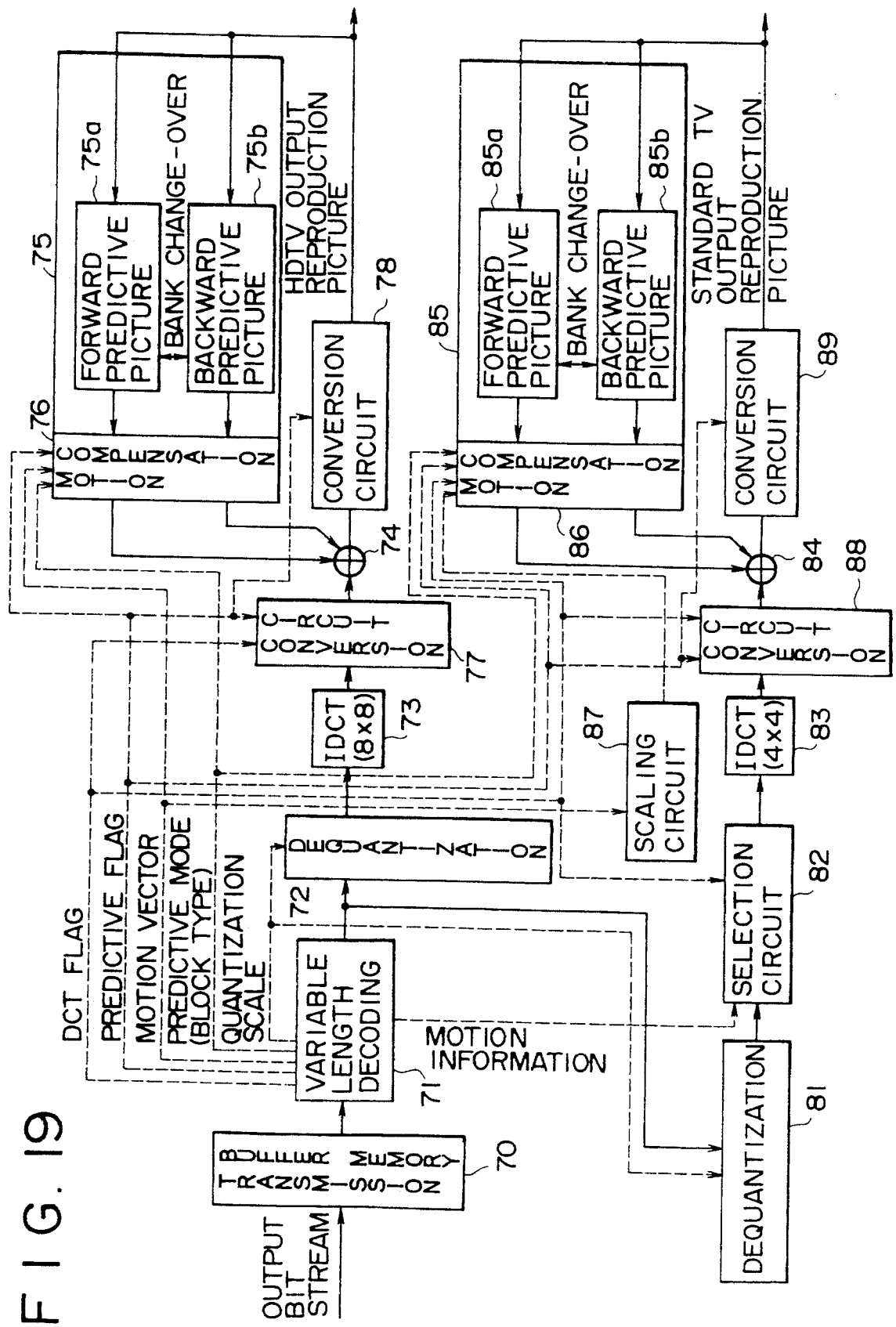
F I G. 19

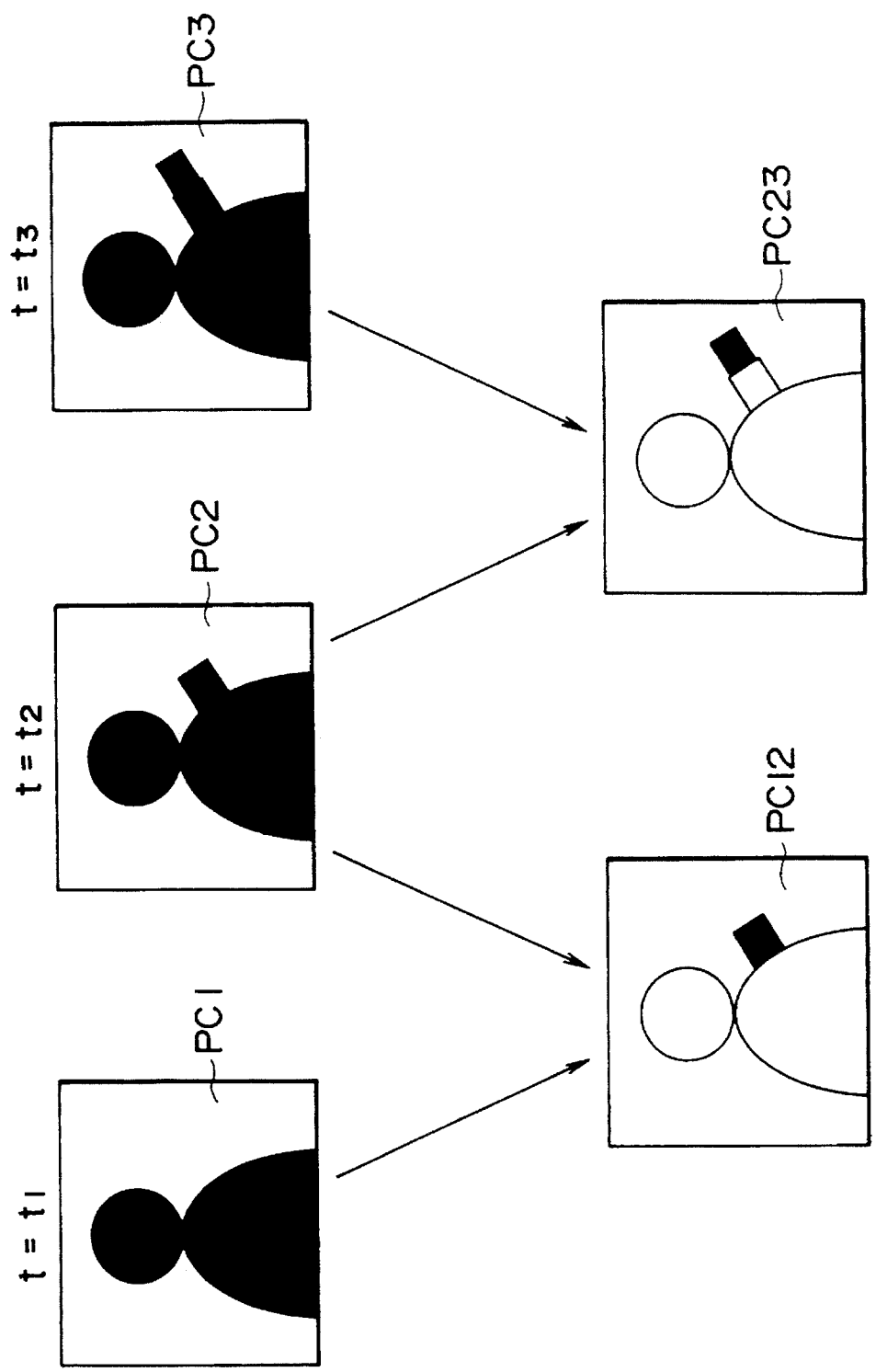

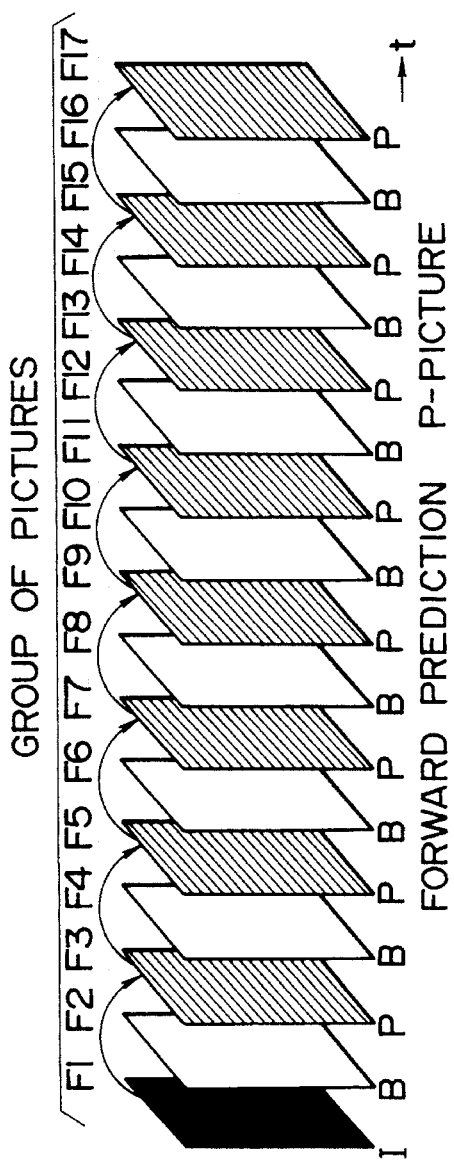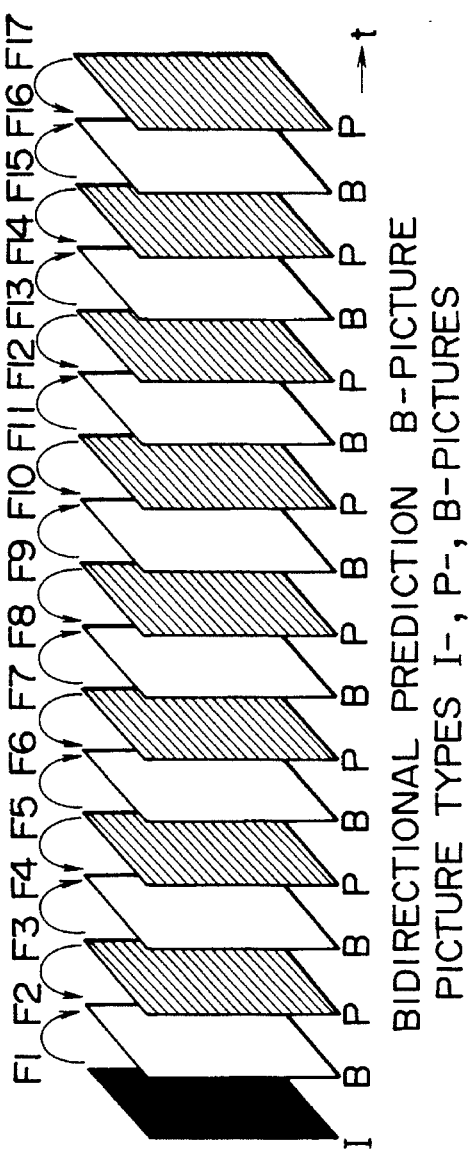

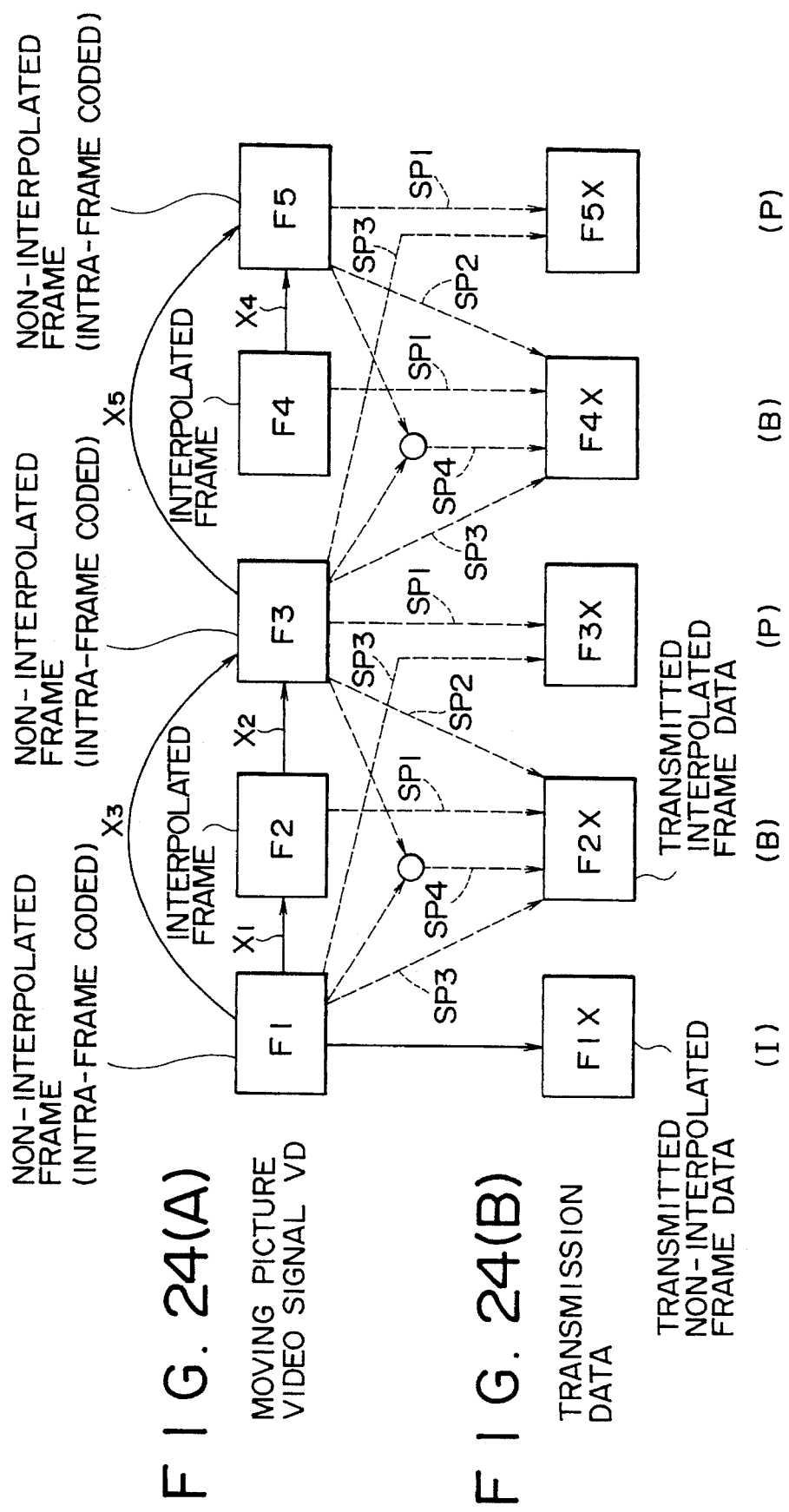

FIG. 27
PRIOR ART

| d(0,0) | d(0,1) | d(0,2) | d(0,3) | d(0,4) | d(0,5) | d(0,6) | d(0,7) |
|---|---|---|---|---|---|---|---|
| d(1,0) | d(1,1) | d(1,2) | d(1,3) | d(1,4) | d(1,5) | d(1,6) | d(1,7) |
| d(2,0) | d(2,1) | d(2,2) | d(2,3) | d(2,4) | d(2,5) | d(2,6) | d(2,7) |
| d(3,0) | d(3,1) | d(3,2) | d(3,3) | d(3,4) | d(3,5) | d(3,6) | d(3,7) |
| d(4,0) | d(4,1) | d(4,2) | d(4,3) | d(4,4) | d(4,5) | d(4,6) | d(4,7) |
| d(5,0) | d(5,1) | d(5,2) | d(5,3) | d(5,4) | d(5,5) | d(5,6) | d(5,7) |
| d(6,0) | d(6,1) | d(6,2) | d(6,3) | d(6,4) | d(6,5) | d(6,6) | d(6,7) |
| d(7,0) | d(7,1) | d(7,2) | d(7,3) | d(7,4) | d(7,5) | d(7,6) | d(7,7) |

FIG. 28
PRIOR ART

| d(0,0) | d(0,1) | d(0,2) | d(0,3) |
|---|---|---|---|
| d(1,0) | d(1,1) | d(1,2) | d(1,3) |
| d(2,0) | d(2,1) | d(2,2) | d(2,3) |
| d(3,0) | d(3,1) | d(3,2) | d(3,3) |

APPARATUS AND METHOD FOR CODING AND DECODING IMAGE SIGNALS

BACKGROUND OF THE INVENTION

This invention relates to compression-coding of image signals and decoding of the compression-coded signals, and more particularly relates to compression-coding of a high definition television (HDTV) signal and decoding of the HDTV signal for conversion into a standard resolution television signal.

It is known to compression-code image signals and then to record the compression-coded signals on a recording medium such as an optical disk, a magneto-optical disk or a magnetic tape and then to reproduce, decompress and display the recorded signal.

FIG. 21 is a block diagram of a previously proposed apparatus in which compression-coded image signals are recorded, and the recorded signals are reproduced and decompressed. In the system shown in FIG. 21, an input image signal such as, for example, a high definition television signal, originating from a signal source (not shown) such as a television camera, a video tape recorder, a video disk player, etc., is supplied to a preprocessing circuit 1. The preprocessing circuit 1 separates the input image signal into a brightness signal component (Y) and a color difference signal component (C). An analog-to-digital (A/D) converter 2 receives the brightness signal component Y and converts it into a digital signal which is stored in a frame memory 4. At the same time, an A/D converter 3 receives the color difference signal C and converts it into a digital signal which is stored in a frame memory 5.

A reformatting circuit 6 converts the frames of digital brightness and color difference signals stored in the frame memories 4 and 5 into data blocks. The resulting data blocks are provided to an encoder circuit 7 which encodes the blocks of data and outputs a bit stream for recording on a recording medium 8, which may be, for example, an optical disk, a magneto-optical disk or a magnetic tape.

A bit stream of data reproduced from the recording medium 8 is provided to a decoder circuit 9, which decodes the bit stream and outputs blocks of decoded data to a format conversion circuit 10. The format conversion circuit 10 converts the blocks of data into frames of brightness and color difference signals which are respectively stored in a brightness signal frame memory 11 and a color difference signal frame memory 12. The brightness data stored in the frame memory 11 is provided to a digital-to-analog (D/A) converter 13 for conversion into an analog brightness signal, while the color difference data stored in the frame memory 12 are provided to a D/A converter 14 for conversion into an analog color difference signal. The resulting analog brightness and color difference signals are composed by a postprocessing circuit 15 to form an output image signal which may be, for example, displayed on a monitor (not shown), rerecorded, transmitted, etc.

The encoding performed by encoder circuit 7 involves compressing the blocks of image data so that the number of bits required for recording the same is reduced. According to conventional compression-coding methods, line correlation or inter-frame correlation within the image signal are used to accomplish compression. When line correlation is used, discrete cosine transform (DCT) processing, or the like, is performed in order to compress the data. Moreover, interframe correlation can be used to provide compression by coding of difference signals. For example, referring to FIG. 22, three succeeding frames PC1, PC2 and PC3 are shown, the same having been generated at respective times t1, t2 and t3. A picture PC12 can be generated by calculating the difference between the pictures PC1 and PC2, and the picture PC23 can be generated by calculating the difference between the pictures PC2 and PC3. Only a relatively small amount of information is required to represent the difference pictures PC12 and PC23, so that coding of signals representing the difference pictures rather than the pictures PC2 and PC3 permits significant data compression. However, it is not possible to reconstitute the entire picture just from the difference pictures. Therefore, it has been proposed to perform compression coding with difference signals by forming each frame of the image signal as one of three types of pictures: an I-picture, a P-picture and a B-picture.

To provide a particular example, and referring to FIG. 23(A), seventeen frames F1 to F17 of an image signal are processed together as a group. The first frame F1 is coded as an I-picture; the second frame F2 is processed as a B-picture; and the third frame F3 is processed as a P-picture. Thereafter, the fourth through seventeenth frames are alternately processed as a B-picture or a P-picture. For the frame which is processed as an I-picture, all of the image data representing the frame are coded for transmission, recording or the like (hereinafter, "transmit" and "transmission" should be understood to include, for example, recording of a signal on a recording medium and reproduction of the recorded signal, as well as transmission through a transmission channel such as a cable, a satellite broadcast system, or a conventional over-the-air broadcast system). For each frame that is processed as a P-picture, the data to be transmitted is the difference between the data for the present frame and the data for the preceding I-picture or P-picture frame, as is illustrated in FIG. 23(A). The data transmitted with respect to each B-picture is calculated as the difference formed by subtracting the image data for the current B-picture frame from an average value formed from the preceding and following frames, as illustrated in FIG. 23(B).

A process of compression coding using inter-frame correlation is schematically illustrated in FIG. 24.

As to the first frame F1, all of the image data is coded for transmission, without reference to other frames, resulting in so-called intra-picture coding.

As to the next frame F2, which is processed as a B-picture, there are four alternative ways in which coding may be performed. The first is simply intra-picture coding as for an I-picture so that a signal indicated as SP1 is transmitted. The second way in which the B-picture frame may be processed is on the basis of the difference between that frame and the following frame F3, resulting in production of a transmission signal SP2. This is referred to as backward predictive coding. The third way in which a B-picture may be processed is based on the difference between the frame F2 and the preceding frame. This produces the transmission signal SP3 and is known as forward predictive coding. Finally, the fourth way in which the B-picture frame may be coded is on the basis of the difference from an average value calculated based on the preceding and following frames. The resulting transmission signal is indicated as SP4 and the method is referred to as bi-directional predictive coding. Whichever one of the four methods results in the minimum amount of transmission data is adopted, and the resulting data is transmitted as transmission data frame F2X. If a processing method other than intra-picture coding is used, then at least one of a motion vector x1 representing motion between the current frame and the previous frame, and a motion vector x2 representing motion between the current frame the next frame, are generated and transmitted with the difference data. In the case of forward prediction coding, the motion vector x1 is transmitted; in the case of backward predictive coding, the motion vector x2 is transmitted; and both are transmitted if bi-directional predictive coding is used.

Regarding the frame F3, which is processed as a P-picture, either intra-picture coding, or forward predictive coding is used, depending on which of those methods results in the smaller amount of data to be transmitted.

Referring to FIG. 25, it will be explained how a frame made up of V lines in a vertical direction and H dots in a horizontal direction is divided into macro blocks. The frame is divided into N slices in the vertical direction and each slice is divided into M macro blocks in the horizontal direction, each macro block consisting of a 16×16 array of picture elements. For each macro block there are formed four 8×8 blocks Y[1] to Y[4] of brightness data, which together represent all of the 16×16 picture elements in the macro block. At the same time, two 8×8 data blocks Cb[5] and Cr[6] representing color difference signals are included in each macro block. With data reduction and time base multiplexing, only an 8×8 block of data is used to represent each type of color difference signal for the 16×16 picture elements of the macro block. Within each slice, the image data is arranged macro block by macro block, and within each macro block, the image data is arranged in the 8×8 blocks in raster scanning order. The order in which the blocks Y[1] to Y[4], Cb[5] and Cr[6] are transmitted is indicated by the numbers that are part of the respective symbols.

High resolution image data, such as data representing an HDTV signal, can be thinned out by a factor of one half in each of the vertical and horizontal directions in order to obtain lower resolution image data. If the aspect ratio of the resulting image is changed from 16:9 to 4:3, then the image can be displayed using a conventional NTSC system television receiver.

FIG. 26 illustrates a decoder that may be used for converting high resolution image data into image data having one-quarter of the resolution (i.e., with the resolution reduced by one-half in each of the horizontal and vertical directions). Such a decoder may be used as the decoder 9 shown in FIG. 21. For the purposes of the decoder shown in FIG. 26, it is assumed that the image data provided thereto resulted from compression-coding by means of DCT processing.

Referring to FIG. 26, the input image signal is in the form of a stream of coefficient data elements which were obtained by performing DCT processing upon 8×8 blocks of picture element data. The input image data stream is provided to the sampling circuit 21, which forms it into 8×8 blocks of coefficient data as shown in FIG. 27. In FIG. 27, the data elements toward the bottom of the array correspond to higher frequency components of the picture in the vertical direction and the data elements toward the right hand side of the array correspond to higher frequency components of the picture in the horizontal direction.

Referring again to FIG. 26, the 8×8 blocks of coefficient data elements are provided to a sampling circuit 22, which forms from those blocks 4×4 blocks of coefficient data elements as shown in FIG. 28. The resulting 4×4 blocks are simply the upper left hand quadrant of the 8×8 block shown in FIG. 27.

The resulting 4×4 block of coefficient data elements is provided to an inverse discrete cosine transform (IDCT) circuit 23, which performs an inverse discrete cosine transform upon the 4×4 block, thereby providing picture element data in which the resolution has been reduced by one-half in both the vertical and horizontal directions. In an apparatus as just described, when lower resolution image data is to be obtained from high resolution image data, only the coefficient data elements corresponding to low frequency components are used. As a result, the interlace structure represented by high frequency components is lost so that the low resolution picture produced by the conventional apparatus fails to present motion smoothly. Further, when predictive coding is used in a conventional system as described above in which DCT processing is applied on the encoder side to 8×8 blocks of picture elements and on the decoder side 4×4 blocks of picture elements are provided from the decoded data in order to provide a lower resolution picture, the predictive picture produced on the decoder side does not entirely coincide with a predictive picture produced on the encoder side for the purposes of forming difference signals. As a result, when the predictive picture produced on the decoder side is used for decoding difference signals, mismatch errors accumulate, resulting in loss of interlace structure and deterioration in quality of the reproduced low resolution picture.

OBJECTS AND SUMMARY OF THE INVENTION

Accordingly, it is an object of the present invention to provide image signal coding and decoding methods and apparatus in which a low resolution signal formed from a compression-coded high resolution signal retains an interlace structure present in the high resolution signal and exhibits smooth motion.

In accordance with an aspect of the present invention, there is provided a method of decoding image data in the form of a block of coefficient data elements produced by performing an orthogonal transformation upon a block of picture element data, including the steps of forming from the block of coefficient data elements a subblock having a smaller range than the block, forming a modified subblock by replacing at least one element of the subblock with a corresponding at least one element of the block from outside of the subblock, and performing an inverse orthogonal transformation on the modified subblock to produce reconstituted picture element data.

According to another aspect of the present invention, there is provided an apparatus for encoding picture element data from a frame of picture elements consisting of two interlaced fields, which includes orthogonal transformation means for performing an orthogonal transformation upon the picture element data to produce a block of coefficient data elements representing coefficient data elements arrayed in m rows and n columns, quantization means for quantizing the coefficient data elements to form quantization data, and variable length coding means for performing variable length encoding upon the quantization data and for transmitting the quantization data in variable-length-encoded form. The quantization data is transmitted so that a first group of quantization data, corresponding to an intersection of the first j rows and first k columns of the block of coefficient data elements, j being less than m, k being less than n, is transmitted first, followed by a second group of quantization data, corresponding to an intersection of the last N rows and the first k columns of the block of coefficient data elements, N being a positive integer that is less than j, followed by a third group of quantization data, corresponding to all of the quantization data that was not within the first or second group.

According to a further aspect of the invention, there is provided an apparatus for decoding a block of image data that was generated by performing an orthogonal transformation upon a block of picture element data from a frame of picture elements consisting of two interlaced fields, where the orthogonal transformation produced a block of coefficient data elements representing coefficient data elements arrayed in m rows and n columns and the block of coefficient data elements was then quantized and variable-length-encoded. The apparatus includes variable length decoding means for performing variable length decoding upon the image data to form decoded data, dequantization means for dequantizing the decoded data to recover the block of coefficient data elements, subblock forming means for forming a j row by k column subblock from the recovered block of coefficient data elements, j being less than m, k being less than n, with the first j-1 rows of the subblock being formed as an intersection of the first j-1 rows and first k columns of the recovered block of coefficient data elements, and each element of the jth row of the subblock being formed as the sum of respective corresponding elements of the jth and mth rows of the recovered block of coefficient data elements. The apparatus also includes inverse orthogonal transformation means for performing an inverse orthogonal transformation upon the subblock.

According to still a further aspect of the invention, there is provided a method of encoding picture element data from a frame of picture elements consisting of two interlaced fields including the steps of performing an orthogonal transformation upon the picture element data to provide a block of coefficient data elements representing coefficient data elements arrayed in m rows and n columns, quantizing the coefficient data elements to form quantization data, and performing variable length encoding upon the quantization data with the quantization data being variable-length-encoded so that a first group of quantization data, corresponding to an intersection of the first j rows and first k columns of the block of coefficient data elements (j being less than m, k being less than n) is encoded first, followed by a second group of quantization data corresponding to an intersection of the last N rows and the first k columns of the coefficient data elements (N being a positive integer that is less than j), followed by a third group of quantization data, corresponding to all of the quantization data that was not within the first or second group.

In the image signal coding and decoding methods and apparatus in accordance with the invention, DCT processing is performed on picture element data to produce m×n blocks of coefficient data. From each of these blocks a j×k subblock of coefficient data is formed and the jth row of the subblock is replaced either by corresponding elements of the mth row of the block or by sums of corresponding elements of the jth row and the mth row.

Consequently, the subblock represents low frequency components of the image but also includes coefficient data representative of high frequency components so that the interlace structure represented by the m×n blocks is retained and the picture exhibits smooth motion.

The above, and other objects, features and advantages of the present invention will be apparent from the following detailed description thereof which is to be read in connection with the accompanying drawings, in which like parts or elements are denoted by like reference characters.

BRIEF DESCRIPTION OF THE DRAWINGS

FIG. 1 and FIGS. 1(A)–1(C) together form a block diagram of an image signal coding apparatus in which the present invention is applied;

FIGS. 2(A) and 2(B) are diagrammatic illustrations of the operation of a predictive mode change-over circuit that is part of the image signal coding apparatus of FIGS. 1(A)–1(C);

FIGS. 3(A) and 3(B) are diagrammatic illustrations of the operation of a DCT mode change-over circuit that is part of the image signal coding apparatus of FIGS. 1(A)–1(C);

FIG. 4 is a table that illustrates operation of an address control circuit shown in FIG. 7;

FIG. 5 is a table showing zigzag scanning of the data elements shown in FIG. 4;

FIG. 7 is a block diagram of a selection circuit that is part of the image signal decoding apparatus of FIG. 6;

FIG. 12 is a table showing a subblock formed from the left upper quadrant of the table of FIG. 4;

FIG. 13 is a table which illustrates a modification of the subblock of FIG. 12 in which the last row is formed by adding data from the fourth and eighth rows of the table of FIG. 4;

FIG. 14 is a table which illustrates a modification of the subblock of FIG. 12 in which data in the fourth row is replaced by data from the eighth row of the table of FIG. 4;

FIG. 15 is a table which illustrates another modification of the subblock of FIG. 12 in which data in the third and fourth rows are respectively replaced by data from the seventh and eighth rows of the table of FIG. 4;

FIG. 16 is a table which illustrates the order in which the data contained in the table of FIG. 4 is to be transmitted in accordance with a zigzag scanning method that facilitates formation of the table shown in FIG. 15;

FIG. 19 is a block diagram of another embodiment of a image signal decoding apparatus in which the present invention is applied;

FIG. 22 is a diagrammatic illustration of data compression using inter-frame correlation;

FIGS. 23(A) and 23(B) are diagrammatic illustrations of different picture types forming a group of frames used in performing data compression based on inter-frame correlation;

FIGS. 24(A) and 24(B) are diagrammatic illustrations of processing methods used in forming transmitted data during compression-coding based upon inter-frame correlation;

FIGS. 27 and 28 are tables which illustrate respective blocks of data produced by sampling circuits that are part of the decoder of FIG. 26.

DETAILED DESCRIPTION OF THE PREFERRED EMBODIMENTS

Figure 21:
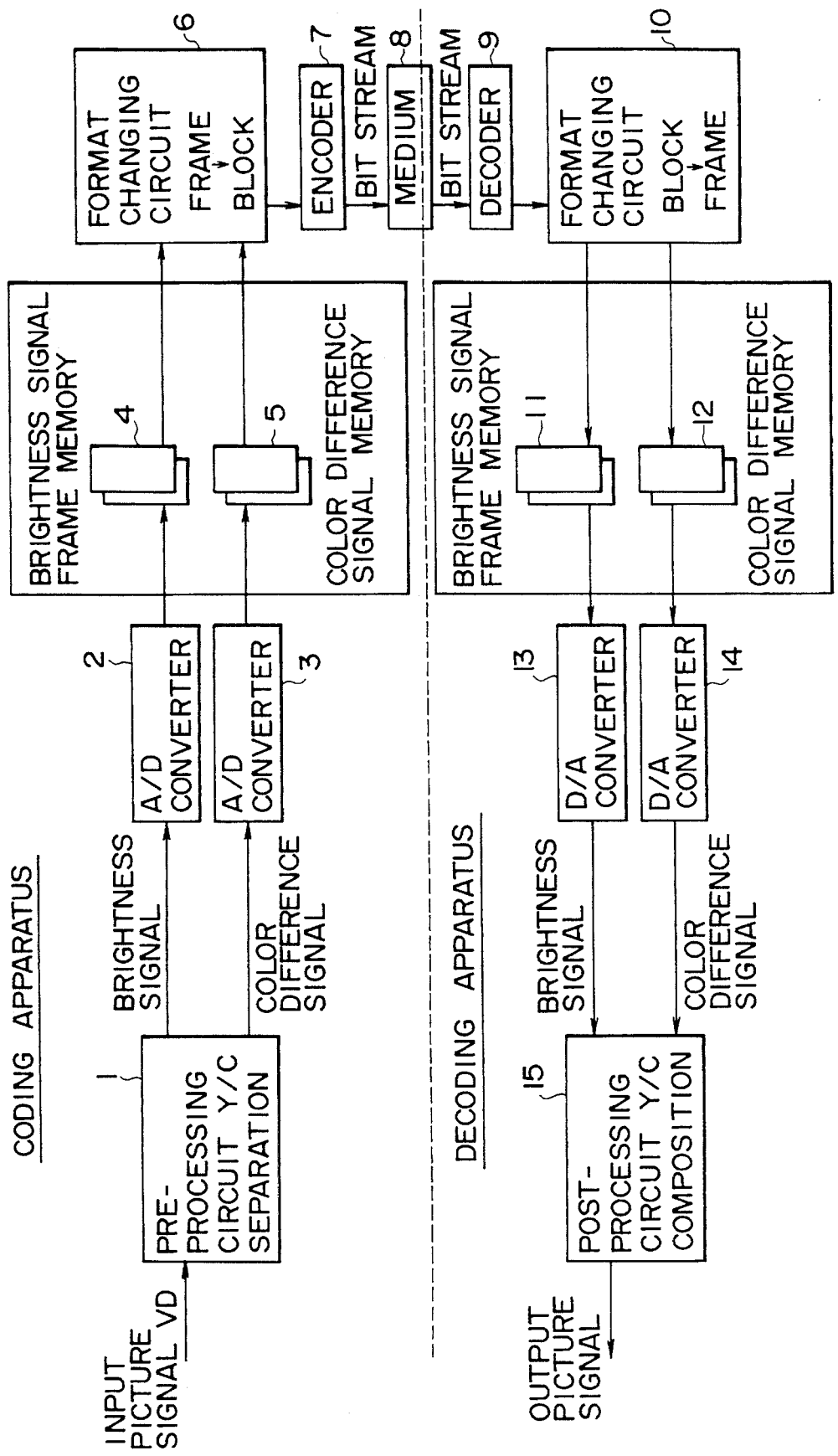
FIG. 21 is a block diagram of conventional image signal coding and decoding apparatus.
Figure 25:
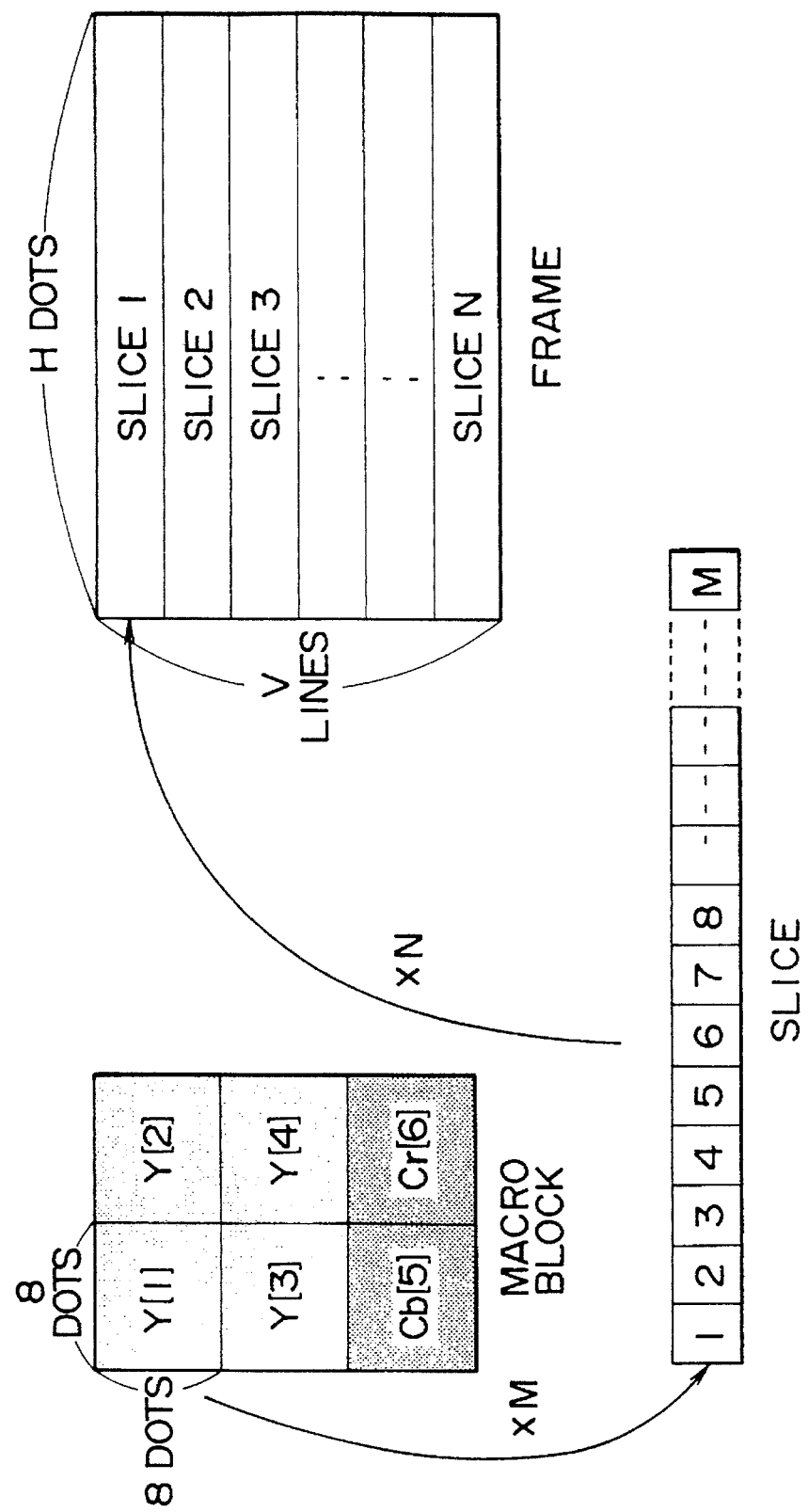
FIG. 25 is a diagrammatic illustration of a conventional transmission format.
Figure 26:
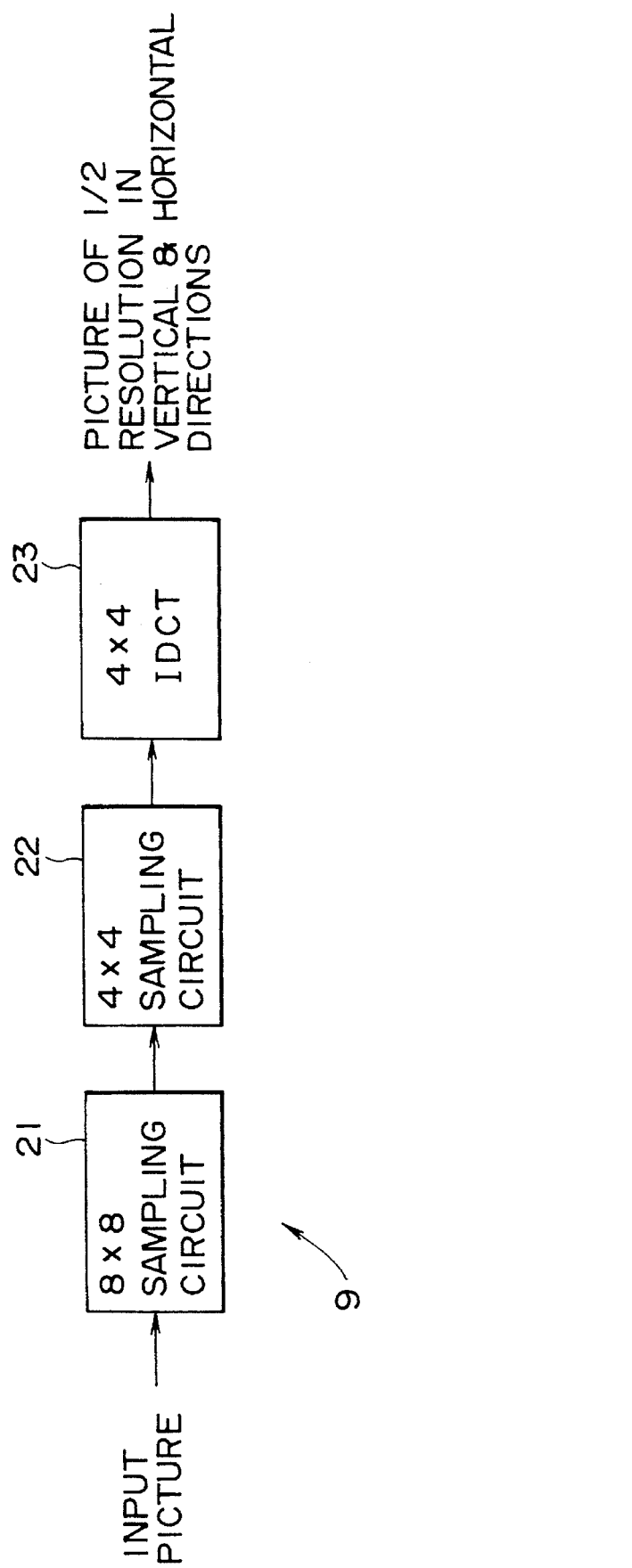
FIG. 26 is a block diagram of a decoder circuit that has been proposed for use in the image signal decoding apparatus shown in FIG. 21.

Image signal coding and decoding apparatus according to the present invention are similar to the conventional image signal coding and decoding apparatus described above with respect to FIG. 21, except for the encoder 7 and decoder 9 which, in the apparatus of the present invention, are different from the corresponding circuits used in the conventional apparatus. Accordingly, only the encoder 7 and decoder 9 in accordance with the present application will be described in detail herein, the description of the remaining portions of the coding and decoding apparatus being omitted to avoid redundancy.

Figure 1A:
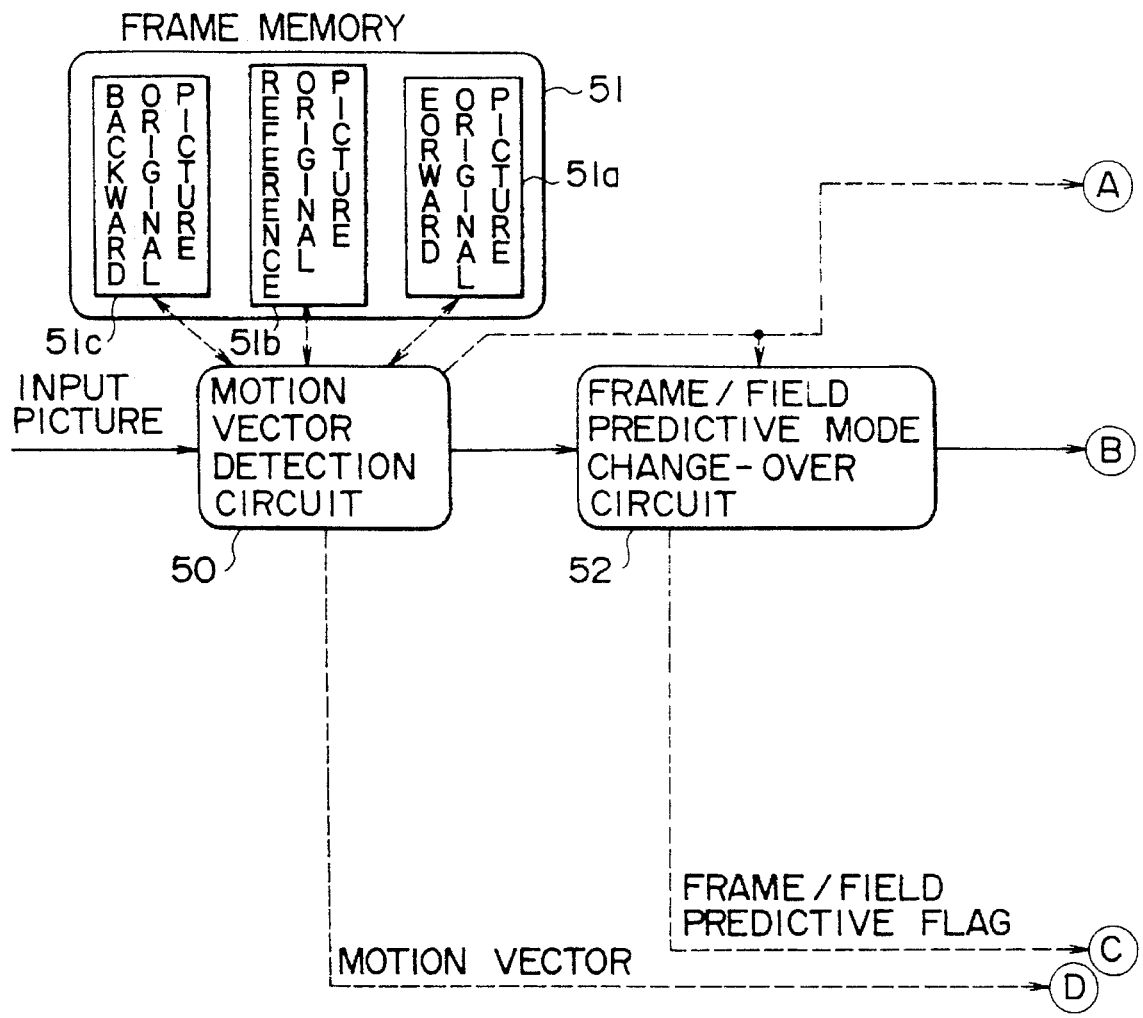
Figure 1:
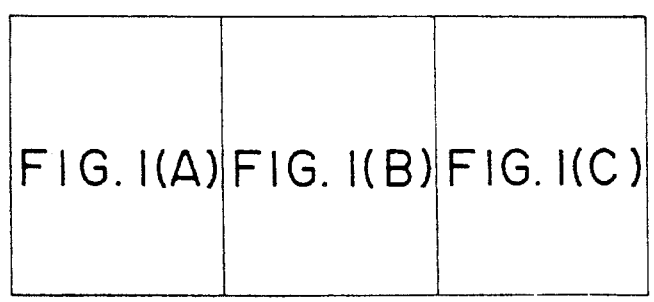
Figure 1B:
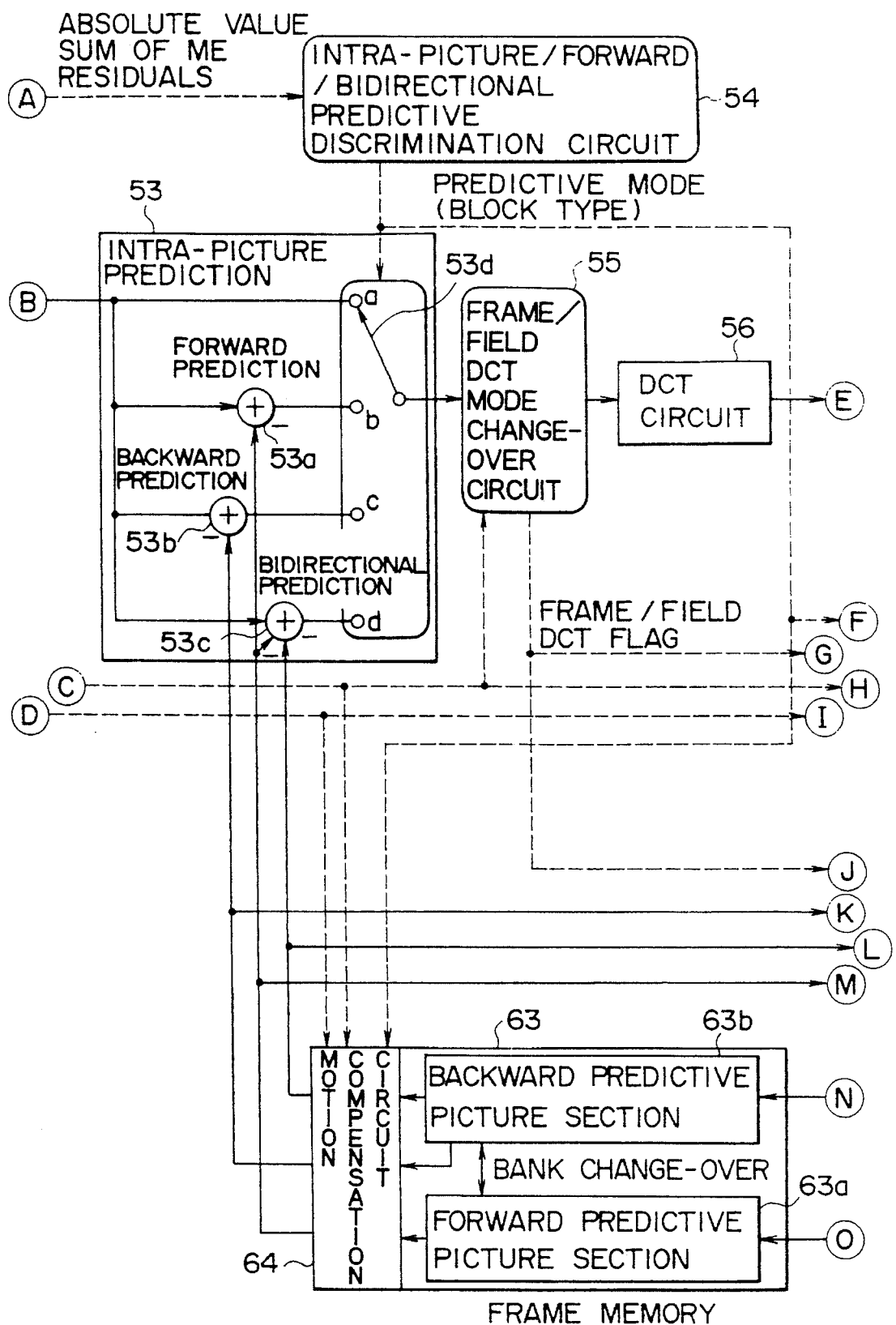

Referring first to FIG. 1, there is shown therein an encoder according to the present invention. Image data for encoding is supplied in the form of macro blocks to a motion vector detection circuit 50. The motion vector detection circuit 50 processes each frame of image data as an I-picture, a P-picture or a B-picture in accordance with a preset sequence that has been determined in advance. For example, as shown in FIG. 23, a group of 17 frames F1–F17 are processed, respectively, as an I-picture, a B-picture, a P-picture, and so forth, alternating between B- and P-pictures for the rest of the group of frames.

When a frame is to be processed as an I-picture, such as, for example frame F1, the image data for the frame are transferred from the motion vector detection circuit 50 to a forward original picture section 51a of a frame memory 51 for storage therein. When a frame of image data is to be processed as a B-picture (such as frame F2), the data are transferred for storage in reference original picture section 51b, and image data for a frame that is to be processed as a P-picture (such as frame F3) are transferred for storage in a backward original picture section 51c.

Further, when the next frame is to be processed as a B-picture (such as frame F4) or a P-picture (such as frame F5), the image data for the P-picture (such as frame F3) then stored in the backward original picture section 51c are transferred to the forward original picture section 51a while the image data of the next B-picture (such as frame F4) are stored by overwriting the same in the reference original picture section 51b and the image data for the next P-picture (such as frame F5) are stored by rewriting the same into the backward original picture section 51c. This sequence of operations, as just described, is repeated successively throughout the group of 17 frames.

Image data representing a picture stored in the frame memory 51 is read out for processing in a frame predictive mode or a field predictive mode by a predictive mode change-over circuit 52. Further, under the control of a predictive mode determination circuit 54, calculations with respect to intra-picture prediction, forward prediction, backward prediction or bi-directional prediction are performed by a calculation section 53. The determination of which type of processing should be performed is based on a prediction error signal formed as a difference between a reference original picture for the frame being processed and a predictive picture. Accordingly, the motion vector detection circuit 50 generates predictive error signals in the form of sums of absolute values or sums of squares for the purpose of the determination.

Operation of predictive mode change-over circuit 52 in a frame predictive mode and a field predictive mode will now be described.

When operation is to be in the frame predictive mode, the predictive mode change-over circuit outputs four brightness blocks Y[1] to Y[4] as the same are received from the motion vector detection circuit 50. The blocks output from predictive mode change-over circuit 52 are provided to the calculation section 53. In particular, data representing lines of both odd-numbered and even-numbered fields are presented mixed together in each block of brightness data as shown in FIG. 2(A). In the frame predictive mode, prediction is performed on the basis of four blocks of brightness data (i.e. an entire macro block) with one motion vector being provided for the four blocks of brightness data.

On the other hand, in the field predictive mode, the predictive mode change-over circuit performs processing upon an input signal which is provided thereto from the motion vector detection circuit 50 so that the signal is arranged in the form shown in FIG. 2(B). Thus, the brightness data blocks Y[1] and Y[2] represent picture elements from the lines for an odd-numbered field, while the other two brightness data blocks Y[3] and Y[4] represent data for lines from even-numbered fields. The resulting data is output from predictive mode change-over circuit 52 to the calculation section 53. In this case, a motion vector for odd-numbered fields corresponds to the two blocks of brightness data Y[1] and Y[2], while a separate motion vector for even-numbered fields corresponds to the other two blocks of brightness data Y[3] and Y[4].

The motion vector detection circuit 50 outputs to the predictive mode change-over circuit 52 respective sums of absolute values of predictive errors for the frame predictive mode and the field predictive mode. The predictive mode change-over circuit 52 compares the two sums of predictive errors, performs processing on the absolute value sum corresponding to the predictive mode in which the absolute value sum has a lower value, and outputs the resulting data to the calculation section 53.

However, according to a preferred embodiment of the invention, the processing described above is entirely performed within the motion vector detection circuit 50, which outputs a signal in the form corresponding to the appropriate predictive mode to the predictive mode change-over circuit 52, which simply passes that signal on without change to the calculation section 53.

Concerning the color difference signal, it should be understood that in the frame predictive mode that signal is supplied to the calculation section 53 in the form of data for mixed lines of odd-numbered fields and even-numbered fields as shown in FIG. 2(A). On the other hand, in the field predictive mode, the first four lines of the color difference blocks Cb[5] and Cr[6] are color difference signals for odd-numbered fields corresponding to the blocks of brightness data Y[1] and Y[2], while the last four lines are color difference signals for even-numbered fields, corresponding to the blocks of brightness data Y[3] and Y[4] as shown in FIG. 2(B). The motion vector detection circuit 50 also produces a sum of absolute values of predictive errors from which it is determined whether the predictive mode determination circuit 54 performs intra-picture processing, forward prediction, backward prediction or bi-directional prediction.

In particular, the motion vector detection circuit 50 forms an absolute value sum of errors for intra-picture processing by subtracting the absolute value of a sum of signals Aij from a macro block of a reference original picture from a sum of absolute values of the signals Aij for the macro block. In other words, the absolute value sum of errors for intra-picture processing is formed as |ΣAij|−Σ|Aij|. The motion vector detection circuit 50 forms an absolute value sum of predictive errors for forward prediction by calculating a sum of absolute values of differences Aij−Bij between signals Aij from a macro block of a reference original picture and signals Bij of a corresponding macro block of a predictive picture. In other words, the absolute value sum of predictive errors for forward prediction is formed as Σ|Aij−Bij|. Moreover, the motion vector detection circuit 50 calculates absolute value sums for backward prediction and bi-directional prediction in a similar manner as for forward prediction, the difference being the predictive picture which is used for making the calculation.

The absolute value sums thus calculated are provided to the predictive mode determination circuit 54, which selects the one of the absolute value sums which has the smallest value. The predictive mode determination circuit 54 also compares the absolute value sum of predictive errors for inter-frame prediction and the absolute value sum of errors for intra-frame processing, and selects the one which has a lower value, establishing as the predictive mode to be performed the mode corresponding to the selected absolute value sum. That is, if the absolute value sum of errors for intra-frame processing is lower, then the intra-picture processing mode is to be performed. On the other hand, if the absolute value sum of errors for inter-frame processing is lower, a mode corresponding to the lowest of the absolute value sums with respect to the forward predictive mode, the backward predictive mode and the bi-directional predictive mode is selected.

In this manner, the motion vector detection circuit 50 supplies a signal for one macro block of a reference original picture to the calculation section 53 by way of the predictive mode change-over circuit 52. The form in which the macro block is supplied corresponds to the one of the frame predictive mode and the field predictive mode selected by the predictive mode change-over circuit 52. The motion vector detection circuit 50 also detects a motion vector between a reference original picture and a predictive picture which corresponds to the one of the four modes selected by the predictive mode determination circuit 54. The detected motion vector is output from the motion vector detection circuit 50 to a variable length coding circuit 58 and a motion compensation circuit 64. As described above, the motion vector is selected so that the corresponding absolute value sum of predictive errors is minimized.

When the motion vector detection circuit 50 reads out data for a frame to be processed as an I-picture from forward original picture section 51a, the predictive mode determination circuit 54 establishes an intra-frame (i.e., intra-picture) processing mode, in which no motion compensation is performed, and causes switch 53d of the calculation section 53 to be positioned at a contact a so that the image data for the frame to be processed as an I-picture are supplied to a DCT mode change-over circuit 55.

The DCT mode change-over circuit 55 arranges data contained in the four blocks of brightness data so that, for a frame DCT mode, lines of odd-numbered and even-numbered fields are mixed, or, in a field DCT mode, so that the lines for odd-numbered fields and even-numbered fields are separated, as respectively shown in FIGS. 3(A) and 3(B).

The DCT mode change-over circuit 55 outputs the resulting data to a DCT circuit 56. More specifically, the DCT mode change-over circuit 55 performs a comparison of the coding efficiency that would be provided depending on whether the data for odd-numbered fields and even-numbered fields are presented mixed together or separately, and based on the comparison selects the mode which will result in higher coding efficiency.

For example, the DCT mode change-over circuit 55 arranges signals which it receives so as to be in the form of mixed lines of odd-numbered fields and even-numbered fields as shown in FIG. 3(A), and calculates differences between vertically adjacent lines respectively of the odd-numbered fields and the even-numbered fields. From the differences the DCT mode change-over circuit 55 calculates a sum of absolute values or sum of squares. On the other hand, the DCT mode change-over circuit 55 rearranges the input signals which it receives so as to be in the form shown in FIG. 3(B), with lines of odd-numbered fields and even-numbered fields being separate from each other. The circuit 55 then calculates differences between vertically adjacent lines from odd-numbered fields and vertically adjacent lines from even-numbered fields and again calculates an absolute value sum or a sum of squares of the differences. The DCT mode change-over circuit 55 compares the resulting sums and selects the DCT mode which corresponds to the lower sum. That is, if the sum produced with the arrangement of FIG. 3(A) is lower, then the frame DCT mode is selected, but if the sums resulting from the arrangement of FIG. 3(B) is lower, then the field DCT mode is selected.

When it occurs that the predictive mode change-over circuit 52 selects the frame predictive mode (with the data arrangement as shown in FIG. 2(A)) and the DCT mode change-over circuit 55 selects the frame DCT mode (with the data arrangement shown in FIG. 3(A)) or, alternatively, when the predictive mode change-over circuit 52 selects the field predictive mode (with the data arrangement shown in FIG. 2(B)) and the DCT mode change-over circuit 55 selects the field DCT mode (with the data arrangement of FIG. 3(B)), in both of these cases the DCT mode change-over circuit 55 does not need to rearrange the data.

By contrast, when the predictive mode change-over circuit 52 selects the field predictive mode (having the data arrangement shown in FIG. 2(B)) and the DCT mode change-over circuit 55 selects the frame DCT mode (with a data arrangement shown in FIG. 3(A)), or in the case where the predictive mode change-over circuit 52 selects the frame predictive mode (with the data arrangement shown in FIG. 2(A)) and the DCT mode change-over circuit 55 selects the field DCT mode (with the data arrangement shown in FIG. 3(B)), then the DCT mode change-over circuit performs data rearrangement. So that correct processing is performed, a predictive flag signal is supplied from the predictive mode change-over circuit 52 to the DCT mode change-over circuit 55.

The DCT mode change-over circuit 55 outputs data in the form corresponding to the selected DCT mode to the DCT circuit 56 and also outputs a DCT flag signal indicative of the selected DCT mode to the variable length coding circuit 58 and a conversion circuit 65.

It will be seen from comparing the data arrangement for the field predictive mode (FIG. 2(A)) and the data arrangement for the frame DCT mode (FIG. 3(A)), that the two arrangements are substantially the same; also, the respective data arrangements for the field predictive mode (FIG. 2(B)) and the field DCT mode (FIG. 3(B)) also are substantially the same.

When the frame predictive mode, with odd-numbered lines and even-numbered lines mixed together, is selected by the predictive mode change-over circuit 52, it is likely that the DCT mode change-over circuit 55 will select the frame DCT mode, in which, again, odd-numbered and even-numbered lines are mixed together. On the other hand, when the field predictive mode, with separation of odd-numbered and even-numbered lines, is selected by the predictive mode change-over circuit 52, it is likely that the DCT mode change-over circuit will select the field DCT mode, which also has a data arrangement in which even-numbered and odd-numbered lines are separated.

However, this is not always the case, and the predictive mode change-over circuit 52 selects a mode so as to minimize the absolute value sum of predictive errors, while the DCT mode change-over circuit 55 selects a mode so as to achieve the highest coding efficiency.

Image data for a frame to be processed as an I-picture is outputted from the DCT mode change-over circuit 55 and supplied to the DCT circuit 56, which performs discrete cosine transform processing on the data to produce DCT coefficients. The DCT coefficients are supplied to a quantization circuit 57, which quantizes the coefficients in accordance with a quantization scale that corresponds to the amount of data which has been accumulated in a transmission buffer 59. The resulting quantized data are then supplied to a variable length coding circuit 58.

The variable length coding circuit 58 converts the coefficient data (in this case data for an I-picture frame) supplied thereto from the quantization circuit 57 into a variable length code such as, for example, a Huffman code in accordance with a quantization scale signal supplied thereto from the quantization circuit 57. The variable length coding circuit outputs the resulting variable-length-encoded data to a transmission buffer memory 59.

It is a characteristic of the discrete cosine transform that the coefficients representing low frequency components are high in power and are located in the upper left quadrant of the block of coefficient data (as shown by shading of the upper left quadrant of the 8×8 block of DCT coefficients illustrated in FIG. 4). In general, the coefficients are coded in the form of a variable length code as a combination of run lengths of zero values and coefficients having a non-zero level. Coding in this form is referred to as run length coding.

For the purposes of run length coding, long zero runs can be produced by transmitting the coefficients in an order referred to as zigzag scanning, which is illustrated in FIG. 5. In FIG. 5, the numerals in each square indicate the order in which the coefficients are transmitted. Because of the long zero runs produced with zigzag scanning, additional data compression is achieved.

The variable length coding circuit 58 receives the quantization scale from the quantization circuit 57, a predictive mode signal (selected from among signals for intra-picture processing mode, forward predictive mode, backward predictive mode and the bi-directional predictive mode) from the predictive mode determination circuit 54, a motion vector signal from the motion vector detection circuit 50, a predictive flag signal indicating whether the frame predictive mode or the field predictive mode is selected from the predictive mode change-over circuit 52, and a DCT flag signal for indicating whether the frame DCT mode or the field DCT mode has been selected from the DCT mode change-over circuit 55. The variable length coding circuit 58 converts these signals into variable length code together with the zigzag scanned quantization data.

The data supplied to the transmission buffer memory 59 are stored therein and output as a data stream with a predetermined timing. Also, the transmission buffer memory 59 feeds back to the quantization circuit 57 a quantization control signal for each macro block in response to an amount of data remaining to be transmitted from the transmission buffer 59. The quantization scale is controlled on the basis of the signal fed back from the transmission buffer 59 to the quantization circuit 57. Thus the transmission buffer memory 59 adjusts the amount of data formed as the bit stream so that only the appropriate amount of data is formed, with no overflow or underflow.

For example, if the amount of data remaining to be transmitted in the transmission buffer memory 59 reaches an upper allowable limit, then the transmission buffer memory 59 provides a quantization control signal to the quantization circuit 57 so that the quantization scale is increased and the amount of quantization data to be generated is reduced.

On the other hand, if the amount of data remaining to be transmitted from the transmission buffer memory 59 reaches a lower allowable limit, then the quantization control signal provided by the transmission buffer memory 59 causes the quantization circuit 57 to decrease the quantization scale so that the amount of quantization data to be generated is increased.

The bit stream output from the transmission buffer memory 59 is multiplexed with a coded audio signal, a code synchronizing signal and the like, and a code for error correction is also added to the multiplexed signal. Thereafter modulation of a predetermined type is applied. The modulated signal is then recorded, for example, by using a laser to form convex and concave bits on a master disk. A stamping apparatus then uses the master disk to manufacture a large number of optical disks containing copies of the recorded information.

Meanwhile, data representing a frame processed as a I-picture that is output from the quantization circuit 55 is supplied to a dequantization circuit 60 for dequantizing in accordance with a quantization scale signal supplied to the dequantization circuit 60 from the quantization circuit 57. The dequantized signal output from the dequantization circuit 60 is provided to an inverse DCT processing circuit 61, which performs an inverse DCT thereupon, and the resulting signal is supplied to a conversion circuit 65. The conversion circuit 65 places the data received from the IDCT circuit 61 in the form appropriate for the frame predictive mode (as in FIG. 2(A)) or for the field predictive mode (as in FIG. 2(B)), according to a DCT flag signal supplied to the conversion circuit 65 from the DCT mode change-over circuit 55 and also in accordance with a predictive flag signal provided from the predictive mode change-over circuit 52. As a result, the data is made to coincide with the form of the predictive picture data output from the motion compensation circuit 64. The resulting data is provided to an arithmetic unit 62.

Data output from the arithmetic unit 62 is supplied to a conversion circuit 66, which places the data in the appropriate form for the frame predictive mode (shown in FIG. 2(A)) in response to a predictive flag signal. The resulting data is supplied for storage in a forward predictive picture section 63a that is part of a frame memory 63.

Alternatively, a field memory can be substituted for the frame memory 63, in which case the data provided from the arithmetic unit 62 are placed in the form appropriate for the field predictive mode (shown in FIG. 2(B)) by the conversion circuit 66 because data for each field is stored separately.

When a sequence of frames of image data are to be processed so that the first frame is processed as an I-picture, the next frame as a B-picture, the next frame as a P-picture, and thereafter the frames are alternately to be processed as B-pictures and P-pictures, the first frame is processed by the motion vector detection circuit 50 as an I-picture but before processing the second frame, which is to be processed as a B-picture, the third frame is processed as a P-picture, because the B-picture processing involves backward prediction, and so cannot be carried out until the following P-picture has been processed.

Accordingly, the motion vector detection circuit 50, after first processing the I-picture, processes image data for a P-picture stored in the backward original picture section 51c. Then, as previously described, an absolute value sum of inter-frame differences (i.e., predictive errors) for each macro block is supplied from the motion vector detection circuit 50 to the predictive mode change-over circuit 52 and the predictive mode determination circuit 54. The predictive mode change-over circuit 52 and the predictive mode determination circuit 54 select, in accordance with the absolute value sum of predictive errors for each macro block of the P-picture, one of the frame or field predictive modes or the intra-picture processing, forward predictive, backward predictive or bi-directional predictive modes, respectively.

When the intra-frame processing mode is selected, the calculation section 53 controls the switch 53d so that it is positioned at the contact a, as described above. Accordingly, data are provided for transmission by way of the DCT mode change-over circuit 55, the DCT circuit 56, the quantization circuit 57, the variable length coding circuit 58 and the transmission buffer memory 59 as in the case where data for an I-picture is being processed. Further, the data are supplied for storage in the backward predictive picture section 63b of the frame memory 63 by way of the dequantization circuit 60, the IDCT circuit 61, the conversion circuit 65, the arithmetic unit 62 and the conversion circuit 66.

When the forward predictive mode is being carried out, the switch 53d is positioned at the contact b and image data stored in the forward predictive picture section 63a of frame memory 63 (which in this case are image data for the I-picture) are read out and undergo motion compensation by the motion compensation circuit 64 in accordance with a motion vector provided from the motion vector detection circuit 50. In particular, when the predictive mode determination circuit 54 selects the forward predictive mode, the motion compensation circuit 64 adjusts the read address for the forward predictive picture section 63a by an amount which corresponds to the motion vector, the adjustment being made from a position corresponding to the macro block presently being supplied from the motion vector detection circuit 50, so that predictive picture data is read out based upon the adjusted address. Also, the motion compensation circuit 64 arranges the predictive picture data in one of the forms shown in FIGS. 2(A) or 2(B) in response to the frame or field predictive flag signal provided by the predictive mode change-over circuit 52.

The predictive picture data output from the motion compensation circuit 64 are provided to an arithmetic unit 53a. The arithmetic unit 53a subtracts the predictive picture data received from the motion compensation circuit 64 from macro block data supplied from the predictive mode change-over circuit 52, and outputs the resulting predictive error data, representing the difference. The difference data is then transmitted by way of the DCT mode change-over circuit 55, the DCT circuit 56, the quantization circuit 57, the variable length coding circuit 58 and the transmission buffer memory 59. Also, the difference data is locally decoded by the dequantization circuit 60, the IDCT circuit 61 and the conversion circuit 65 and then supplied to the arithmetic unit 62.

The arithmetic unit 62 also receives the same predictive picture data that was supplied to the arithmetic unit 53a. The arithmetic unit 62 adds the predictive picture data received from the motion compensation circuit 62 and the locally decoded difference data received from the conversion circuit 65 to provide reconstituted image data for the P-picture. However, because the data have been arranged in the form shown in FIGS. 2(A) or 2(B) by the predictive mode change-over circuit 52, the data may be rearranged in response to a predictive flag signal received from conversion circuit 66 so that it is in the form for the frame predictive mode (as shown in FIG. 2(A)) or in the form for the field predictive mode (the form shown in FIG. (2B)). Or if the frame memory 63 has been replaced with the field memory, then the data is arranged in the form of FIG. 2(B). The image data for the P-picture are then supplied for storage in the backward predictive picture section 63b of the frame memory 63.

Processing of the B-picture is performed by motion vector detection circuit 50 after the data for the I-picture and the P-picture have been stored respectively in the forward predictive picture section 63a and the backward predictive picture section 63b. Depending upon the magnitude of the absolute value sums of inter-frame differences for each macro block, the predictive mode change-over circuit 52 selects the frame or field predictive mode and the predictive mode determination circuit 54 selects one of the intra-frame processing or forward, backward or bi-directional predictive modes.

If the intra-frame processing mode or the forward predictive mode is selected, switch 53d is positioned at contact a or contact b and processing and data transmission is performed in the manner described above with respect to the P-picture.

However, if the backward predictive mode or the bi-directional predictive mode is selected, then the switch 53d is positioned at contact c or d, as the case may be.

When the backward predictive mode is selected, the switch 53d is positioned at the contact c, and image data stored in the backward predictive picture section 63b (in the present case, image data for a P-picture) are read out and undergo motion compensation by the motion compensation circuit 64 in accordance with a motion vector signal supplied by the motion vector detection circuit 50.

In particular, when the predictive mode determination circuit 54 selects the backward prediction mode, the motion compensation circuit 64 adjusts the read address of the backward predictive picture section 63b by an amount corresponding to the motion vector signal output from the motion vector detection circuit 50, the adjustment being made from a position corresponding to the macro block currently being processed. The motion compensation circuit 64 produces predictive picture data by reading out data from the backward predictive picture section 63b in accordance with the adjusted read address. Also, the motion compensation circuit 64 arranges the data in the form shown in FIG. 2(A) or 2(B) according to the predictive flag signal supplied from the predictive mode change-over circuit 52.

The predictive picture data produced by the motion compensation circuit 64 are supplied to the arithmetic unit 53b. The arithmetic unit 53b subtracts the predictive picture data received from the motion compensation circuit 64 from image data for a macro block of a reference original picture received from the predictive mode change-over circuit 52, and outputs resulting difference data. The resulting difference data are then transmitted by way of the DCT mode change-over circuit 55, the DCT circuit 56, the quantization circuit 57, the variable length coding circuit 58 and the transmission buffer memory 59.

When the bi-directional predictive mode is selected, the switch 53d is positioned at contact d and image data stored in the forward predictive picture section 63a (in the present case, image data for an I-picture) and the image data stored in the backward predictive picture section 63b (in the present case, image data for a P-picture) are read out and undergo motion compensation by the motion compensation circuit 64 in response to a motion vector signal received from the motion vector detection circuit 50. In particular, when the predictive mode determination circuit 54 selects the bi-directional predictive mode, the motion compensation circuit 64 adjusts the read addresses for the forward predictive picture section 63a and the backward predictive picture section 63b by amounts corresponding to respective motion vectors for the forward predictive picture and the backward predictive picture, the adjustment being made from positions corresponding to the macro block presently being output from the motion vector detection circuit 50. The motion compensation circuit 64 produces predictive picture data by reading out data using the adjusted addresses. Also, the data are arranged in an appropriate form according to a predictive flag signal received from the predictive mode change-over circuit 52.

The predictive picture data produced from the motion compensation circuit 64 are supplied to an arithmetic unit 53c. The arithmetic unit 53c subtracts an average value of the predictive picture data supplied by the motion compensation circuit 64 from image data for a macro block of a reference original picture supplied from the motion vector detection circuit 50, and outputs the resulting difference data. The difference data is transmitting by way of the DCT mode change-over circuit 55, the DCT circuit 56, the quantization circuit 57, the variable length coding circuit 58 and the transmission buffer memory 59.

No image data for a B-picture is stored in frame memory 63, because such data is not used as a predictive picture for any other frame.

It is to be noted that bank changing over can be performed when necessary with respect to the forward predictive picture section 63a and the backward predictive picture section 63b of the frame memory 63 and a predetermined reference original picture stored in either one of those sections can be selectively output as a forward predictive picture or a backward predictive picture.

While the foregoing description has been given with respect to blocks of brightness data, blocks of color difference data, as shown in FIGS. 2(A), 2(B), 3(A) or 3(B), are also processed and transmitted. It should be understood that a motion vector used in processing a block of color difference data is obtained by applying a factor of one-half in each of the vertical and horizontal directions to a motion vector for the corresponding block of brightness data.

Figure 6:
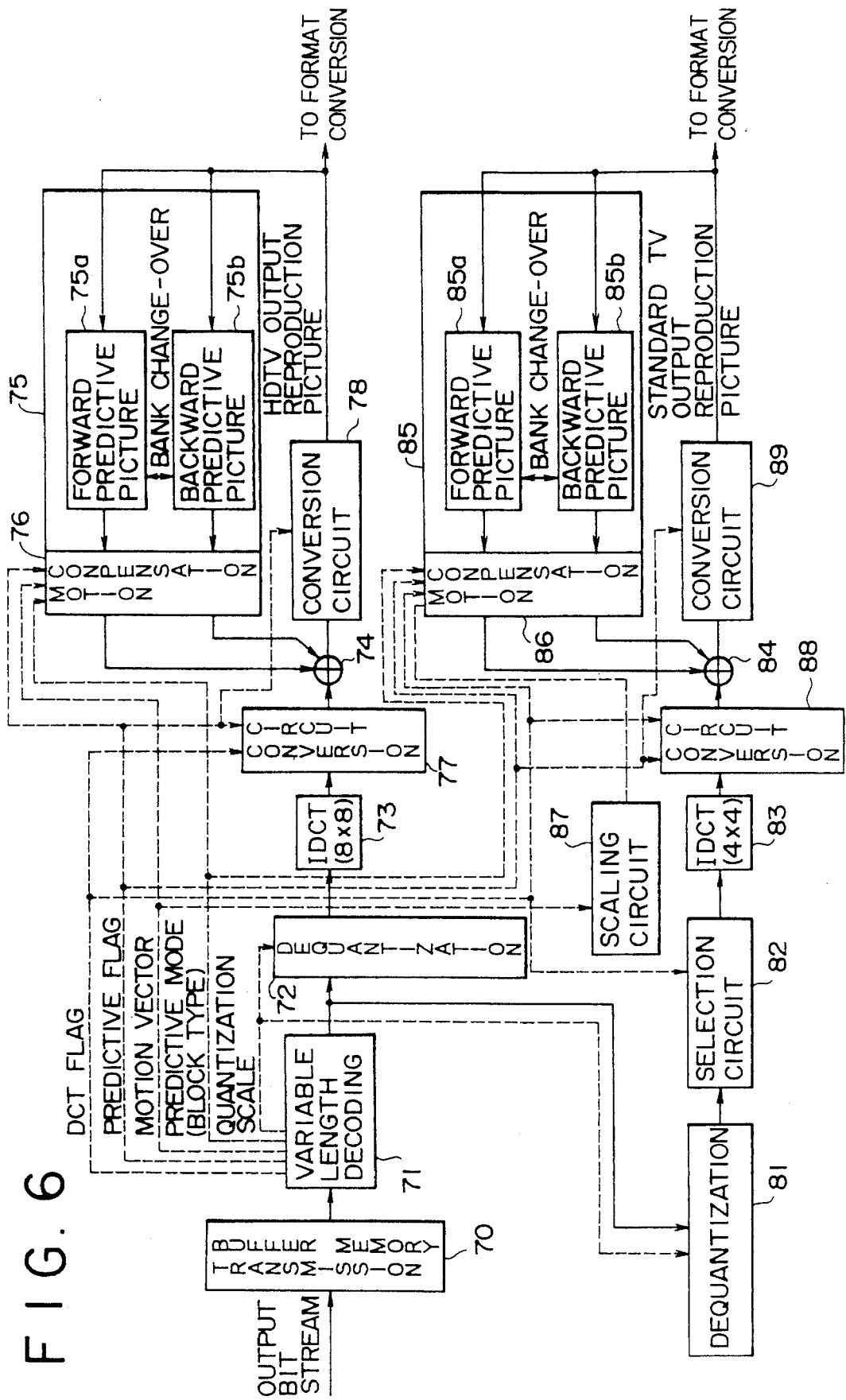
FIG. 6 is a block diagram of an image signal decoding apparatus in which the present invention is applied.

A decoder in which the present invention is applied will now be described with reference to FIG. 6. As shown in FIG. 6, an input bit stream is reproduced from an optical disk or other recording medium (represented by recording medium 8 of FIG. 21) and the reproduced bit stream is supplied to the decoder apparatus of FIG. 6.

The input bit stream is received by way of a reception buffer memory 70 and then is provided for decoding by a variable length decoding circuit (IVLC) 71. The decoding of the bit stream produces quantized data (i.e., DCT coefficients), motion vector signals, predictive mode signals, predictive flag signals, DCT flag signals, quantization scale signals and so forth. The quantized data representing DCT coefficients are supplied from the variable length decoding circuit 71 to a dequantization circuit 72, which dequantizes the data on the basis of a quantization scale signal provided from the variable length decoding circuit 71. The recovered quantized DCT coefficient data output from dequantization circuit 72 represent an 8×8 data block, upon which IDCT processing is performed by an IDCT circuit 73. As a result, an 8×8 block of picture element data is produced. The picture element data blocks are provided to a conversion circuit 77 which performs any rearrangement required in response to DCT flag and predictive flag signals supplied from the variable length decoding circuit 71 so that the data will be arranged in the form that coincides with the form of data to be provided from the motion compensation circuit 76. The rearranged data output from the conversion circuit 77 are supplied to an arithmetic unit 74. If the image data provided to the arithmetic unit 74 are for an I-picture frame, then the data output from the arithmetic unit 74 are provided without change to a conversion circuit 78 for conversion to the form shown in FIG. 2(A), except that the data are provided in the form shown in FIG. 2(*b*) if a field memory is used instead of frame memory 75. After any necessary processing in conversion circuit 78, the data are supplied for storage in a forward predictive picture section 75a of frame memory 75 to allow for production of predictive picture data for subsequent processing of P-picture or B-picture frames. Also, the data output from conversion circuit 78 are supplied to a later stage, such as the format conversion circuit 10 shown in FIG. 21.

Continuing to refer to FIG. 6, when the image data supplied to the arithmetic unit 74 are for a P-picture produced on the basis of predictive picture data from a preceding frame and the forward predictive mode has been selected, the image data for the preceding frame (e.g., image data for an I-picture) stored in the forward predictive picture section 75a of the frame memory 75 are read out and undergo motion compensation by the motion compensation circuit 76 in accordance with a motion vector signal supplied from the variable length decoding circuit 71. Also, the data are arranged in a form shown in FIG. 2(A) or 2(B) in response to the predictive flag signal. The arithmetic unit 74 then adds the image data (i.e., difference data) received from the conversion circuit 77 with the predictive picture data provided from the motion compensation circuit 76, and outputs the resulting data. The resulting data represent decoded data for the P-picture, and are supplied for storage in the backward predictive picture section 75b of the frame memory 75 to allow for production of predictive picture data for subsequent processing of a B-picture or a P-picture.

Of course, if the image data for a P-picture were produced in the intra-picture processing mode, no processing is performed at arithmetic unit 74, as would be the case for an I-picture, and the image data for the P-picture are stored without change in the backward predictive picture section 75b.

Because the P-picture is a frame that is to be displayed after the succeeding B-picture, it is not immediately supplied to the format conversion circuit 10 but rather is supplied only after the B-picture is processed and supplied to the conversion circuit 10.

If the image data supplied from the conversion circuit 77 are for a B-picture frame, the I-picture image data stored in the forward predictive picture 75a of the frame memory 75 (if processing is to be in the forward predictive mode), the P-picture image data stored in the backward predictive picture section 75b (if backward predictive mode processing is to be preformed) or image data for both the I-picture and the P-picture are read out, and motion compensation is performed by the motion compensation circuit 76 on the read-out data in accordance with a motion vector signal provided from the variable length decoding circuit 71. After motion compensation, picture data are arranged in response to a predictive flag signal to produce a predictive picture. However, if no motion compensation is required (i.e., if intra-picture processing was performed on the B-picture), then no predictive picture is produced.

The predictive picture data resulting from motion compensation performed by the motion compensation circuit 76 are added to the difference data output from the conversion circuit 77 at the arithmetic unit 74. The resulting data is restored to the appropriate form in response to the predictive flag signal at conversion circuit 78 and then output to the format conversion circuit 10. Since the reconstituted data for a B-picture is not used to form a predictive picture for any other frame, the B-picture data is not stored in the frame memory 75.

After the data for the B-picture is output, the data for the P-picture, which was previously stored in the backward predictive picture section 75b, are read out and output by way of the motion compensation circuit 76, the arithmetic unit 74 and the conversion circuit 78. In this case motion compensation, rearrangement processing and the like are not performed, the same having previously been accomplished.

While the foregoing description has been given with respect to a brightness data signal, it should be understood that processing of color difference data is performed in a similar manner. As before, a motion vector used in processing the color difference data is obtained by applying a factor of one-half in each of the vertical and horizontal directions to the motion vector used for processing the brightness data.

After digital-to-analog conversion of the data which has been reconstituted as just described, a high definition television picture with high resolution can be provided.

The decoder illustrated in FIG. 6 includes, in addition to the circuitry for obtaining a high definition television signal, additional circuitry for obtaining a standard television signal having one-fourth of the resolution of the HDTV signal. The other circuitry includes a dequantization circuit 81, which dequantizes data output from the variable length decoding circuit 71 in accordance with a quantization scale signal that is also provided from the variable length decoding circuit 71. The resulting data is output to a selection circuit 82. It is to be noted that the dequantization circuit 81 is provided so that both a standard television video output and an HDTV video output can be obtained, and when only one of the two outputs is required, the dequantization circuit 81 may be omitted.

In the case shown in FIG. 6, the output of the dequantization circuit 81 is supplied to the selection circuit 82.

As illustrated in FIG. 7, the selection circuit 82 may include a calculation circuit 90, an address control circuit 91 and a memory 92. Data supplied from the dequantization circuit 81 (or 72, as the case may be) are written into the memory 92. Data read out from the memory 92 are supplied to an IDCT circuit 83 (FIG. 6). Referring again to FIG. 7, the address control circuit 91 controls writing of data into, and reading out of data from, the memory 92. While deferring a detailed description of the writing and reading control performed by the address control circuit 91, it will now briefly be noted that the selection circuit 82 selects a predetermined 4×4 array of DCT coefficients from an 8×8 block of DCT coefficients such as that shown in FIG. 4.

Referring again to FIG. 6, the IDCT circuit 83 performs IDCT processing upon the 4×4 coefficient data block and outputs the resulting picture element data to conversion circuit 88. In response to a DCT flag signal and a predictive flag signal output from the variable length decoding circuit 71, the conversion circuit 88 rearranges the data so that it will coincide with the arrangement of predictive picture data to be received from a motion compensation circuit 86. The conversion circuit 88 outputs the rearranged data to an arithmetic unit 84. The motion compensation circuit 86 performs motion compensation on image data stored in a frame memory 85 in response to motion vector and predictive mode signals supplied thereto from the variable length decoding circuit 71. The motion compensation circuit 86 then rearranges the image data into the form of FIG. 2(A) or 2(B) in response to the predictive mode signal so that predictive picture data are produced.

The predictive picture data output from the motion compensation circuit 86 are added to the data output from the conversion circuit 88. The resulting data are arranged, in response to the predictive flag, into the form for the frame predictive mode (shown in FIG. 2(A)), except that if a field memory is used instead of the frame memory 85, the form for the field predictive mode (FIG. 2(B)) is used. The resulting data is then supplied as data for a standard television picture. It is to be noted that, since motion at the motion compensation circuit 86 is equal to about one-half of motion at the motion compensation circuit 76, a motion vector signal output from the variable length decoding circuit 71 is reduced by one-half by a scaling circuit 87 before being supplied to the motion compensation circuit 86.

In particular, when the frame predictive mode has been selected by the predictive mode determination circuit 54 of the encoder of FIG. 1, the predictive mode for the decoder in FIG. 6 is also selected to be the frame predictive mode. On the other hand, when the field predictive mode is selected in the encoder, the field predictive mode is also selected in the decoder. In short, when the motion compensation circuit 64 of the encoder forms a predictive picture in the frame predictive mode, the motion compensation circuit 86 of the decoder cooperates with the scaling circuit 87 to form a predictive picture in the frame predictive mode. On the other hand, when the motion compensation circuit 64 forms a predictive picture in the field predictive mode, the motion compensation circuit 86 cooperates with the scaling circuit 87 to form a predictive picture in the field predictive mode.

The relationship between motion compensation and the frame or field predictive mode will now be described. In a first frame predictive mode, motion compensation is performed in the encoder by motion compensation circuit 64 (and is similarly performed in the decoder by the motion compensation circuit 76 of the HDTV block of the decoder), by forming a signal predictive frame consisting of a first, odd-numbered field including picture elements a, c, e, g, . . . as shown at part (a) of FIG. 8 and a second, even-numbered field including picture elements b, d, f, . . . as shown at part (a) of FIG. 8.

Meanwhile, motion compensation is performed by the motion compensation circuit 86 of the standard TV decoder block in the decoder of FIG. 6 by forming a predictive frame consisting of a first field including picture elements a', c', . . . and a second field including picture elements z', b', d', .

Figure 8:
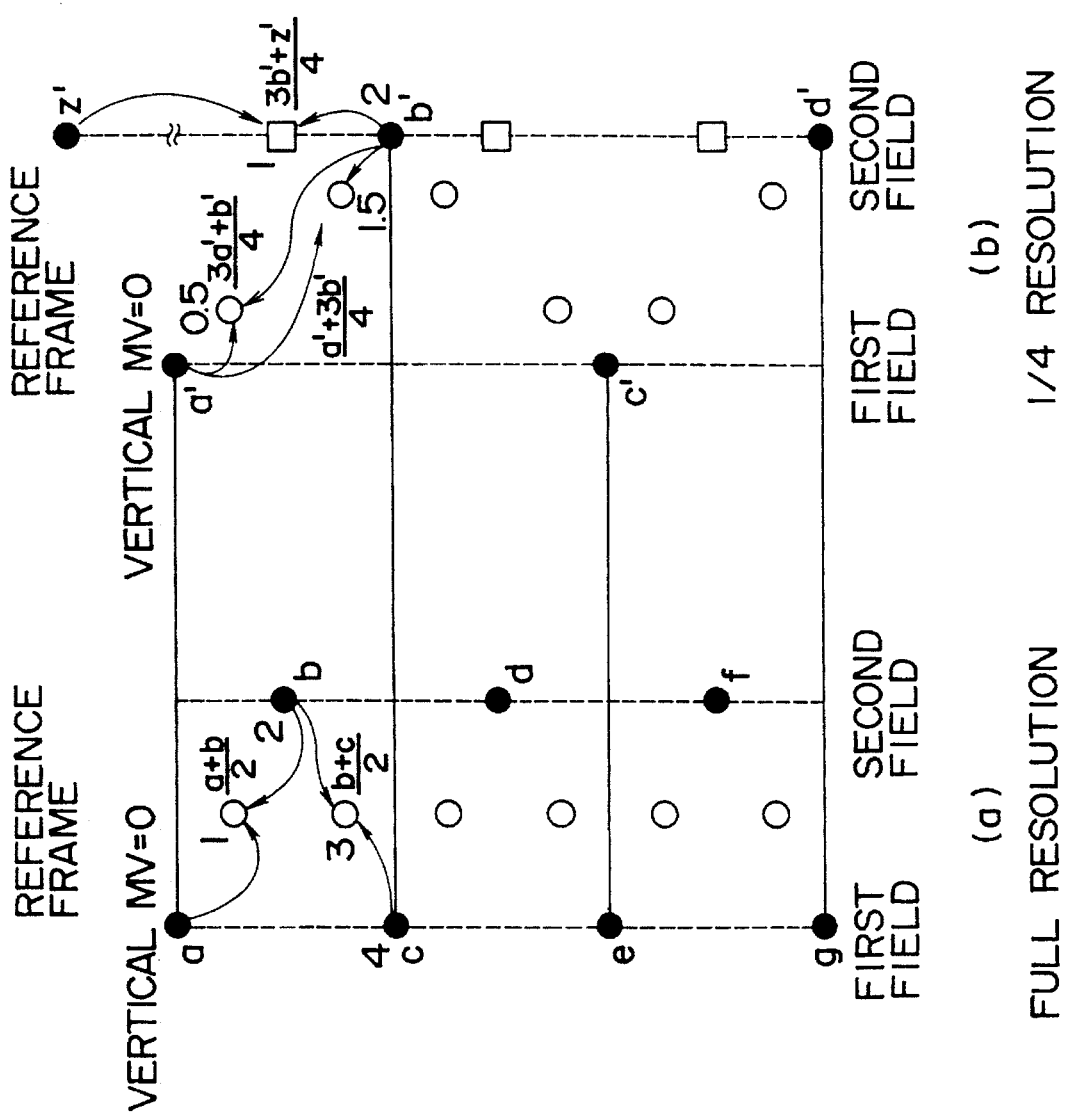
FIGS. 8–11 are respectively diagrammatic illustrations of the operation of a motion compensation circuit that is part of the image signal decoding apparatus of FIG. 6 as it operates in a first frame predictive mode, a field predictive mode, a second frame predictive mode, and a third frame predictive mode.

... as shown in part (b) of FIG. 8. (It should be understood that the distance between picture elements z' and b' is equal to the distance between picture elements b' and d'.)

Conversion of high resolution (HDTV) data into data having one-quarter of the resolution requires that picture elements be thinned out by a factor of one-half in both the horizontal and vertical directions.

Considering only thinning out in the vertical direction, because a frame consists of two interlaced fields, if the lines are thinned out by a factor of one-half in the vertical direction, then one field of high resolution data (in the case shown in FIG. 8, the first field) corresponds to one frame (two fields) of a one-forth resolution signal.

In the particular case shown in FIG. 8, the picture elements a, e, ... out of the picture elements a, c, e, g, for the first field of the high resolution signal correspond to the picture elements a', c', ... for the first field of the low resolution signal, and the picture elements c, g, ... correspond to the picture elements b', d', ... for the second field of the low resolution signal.

A particular example of motion compensation will now be described with respect to the picture element a shown in part (a) of FIG. 8. For respective values 0, 1, 2, 3 or 4 of the motion vector signal (where the value 1 indicates an offset of corresponding to 0.5 picture elements in the vertical direction of a high resolution display screen), the predictive picture element output from the motion compensation circuit 64 which is part of the local decoder of the encoder shown in FIG. 1, is respectively a, (a+b)/2, b, (b+c)/2 or c (it being understood that only motion in the vertical direction is being considered for the purposes of this example). Accordingly, it will be observed that when the motion vector has the value 1 or 3 the predictive picture element is formed by interpolation.

Turning now to the operation of the standard television decoder block with respect to the pixel a', and referring to part (b) of FIG. 8, for the respective values 0, 1, 2, 3 or 4 of the motion vector, respective values of the motion vector as output after scaling by scaling circuit 87 are 0, 0.5, 1, 1.5 and 2, and the predictive picture elements respectively output from the motion compensation circuit 86 (FIG. 6) for those scaled values of the motion vector are a', (3a'+b')/4, (3b'+z')/4, (a'+ b')/4 and b'. Thus, when the motion vector value is 1, 2, or 3 (so that scaled motion vector value provided by the scaling circuit 87 is 0.5, 1 or 1.5), the motion compensation circuit 86 forms the predictive picture element by interpolation. Forming of the predictive picture elements is carried out in a similar manner for values of the motion vector that are 5 or greater.

As seen from FIG. 8, each low resolution picture element corresponds to a high resolution picture element formed in the encoder, so that the field parities and the positions of the respective picture elements coincide. In particular, when the motion vector has a value of 1 or 3, the predictive picture element for the high resolution data is interpolated from picture elements a and c from the first field and the picture element b from the second field (i.e., (a +b)/2 or (b +c)/2). On the other hand, the predictive picture element for the low resolution signal is also formed by interpolation, if the value of the motion vector is 1 or 3 (the scaled motion vector output for the scaling circuit 87 having the value 0.5 or 1.5), from the picture element a' from the first field and the picture element b' from the second field. Therefore, the respective predictive picture elements of the high and low resolution signals coincide with each other in terms of field parities because both of the picture elements are interpolated from the first and second fields. Also, because the weighting values for the picture elements are adjusted, the positions of the picture elements in the vertical directions coincide. Further, when the value of the motion vector is 2 (with the scaled motion vector output from the scaling circuit 87 having the value 1), because the predictive picture element b for the high resolution signal is in the second field, the corresponding predictive picture element for the low resolution signal is interpolated from the picture elements z' and b' (i.e., (3b'+z')/4), which are both in the second field. Therefore, the parities and the positions in the vertical direction of the two predictive picture elements coincide.

Figure 9:
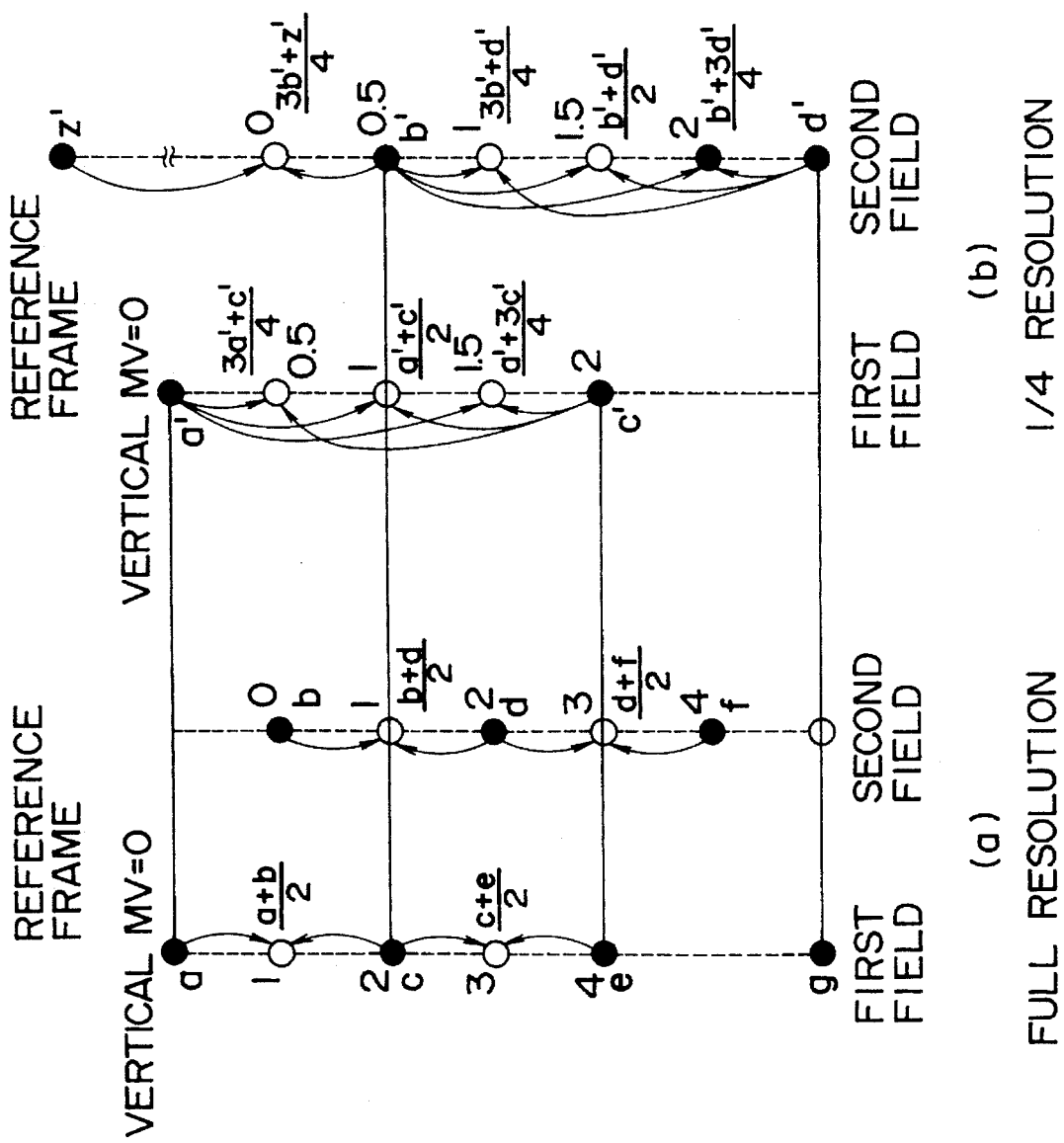

Motion compensation as performed in the field predictive mode will now be described with reference to FIG. 9. In this case, for the values of the motion vector as noted above, the motion compensation circuit 64 in the local decoder of the encoder of FIG. 1 produces predictive picture elements a, (a+c)/2, c, (c+e)/2, and e for the first predictive field and predictive picture elements b, (b+d)/2, d, (d+f)/2, and f for the second predictive field, as shown in part (a) of FIG. 9. Meanwhile in the standard television decoder block of the decoder of FIG. 6, the following picture elements for the first predictive field are provided for the respective values of the motion vector: a', (3a'+c')/4, (a'+c')/2, (a'+3c')/4, c', while the respective picture elements produced for the second predictive field are (3b'+z')/4, b', (3b'+d')/4, (b'+d')/2, (b'+3d')/4, as shown in part (b) of FIG. 9. (It should be noted that the distance between the picture elements z' and b' in part (b) of FIG. 9 is equal to the distance between picture elements b' and d'.)

It will be observed that with respect to the high resolution signal, in both the first and second fields the predictive picture element is produced by interpolation when the value of the motion vector is 1 or 3. Regarding the low resolution signal, in the first field the predictive picture element is produced by interpolation where the motion vector has the values 1, 2 or 3 (the scaled motion vector output by scaling circuit 87 having the values 0.5, 1 and 1.5). In the second field of the low resolution signal, the predictive picture element is produced by interpolation in all cases except when the motion vector has the value 4 (so that the scaled motion vector has the value 2). It should further be noted that the predictive picture elements of the first field of the low resolution signal have positions which coincide in the vertical direction with the positions of the predictive picture elements for the first field of the high resolution signal. The same is also true with respect to the positions of the predictive picture elements for the second fields of the high and low resolution signals.

The second field of the low resolution signal does not have an original picture element at a position that corresponds to the position of pixel element b in the second field of the high resolution signal. Accordingly, when the motion vector has the value 0, a predictive picture element for the second field of the low resolution signal is produced by interpolation (i.e., (3b'+z')/4) and has a position that coincides with the position of the picture element b of the second field of the high resolution signal. This is preferable to using the original picture element b' where the motion vector has the value 0 since the position of the picture element b' does not coincide with the position of the picture element b.

It will also be noted that each interpolated picture element is formed from picture elements which are all in the same field, so that the parities of the picture elements of the low resolution signal coincide with the parities of corresponding picture elements in the high resolution signal.

A second frame predictive mode that is different from the previously described first frame predictive mode will now be described with reference to FIG. 10.

Figure 10:
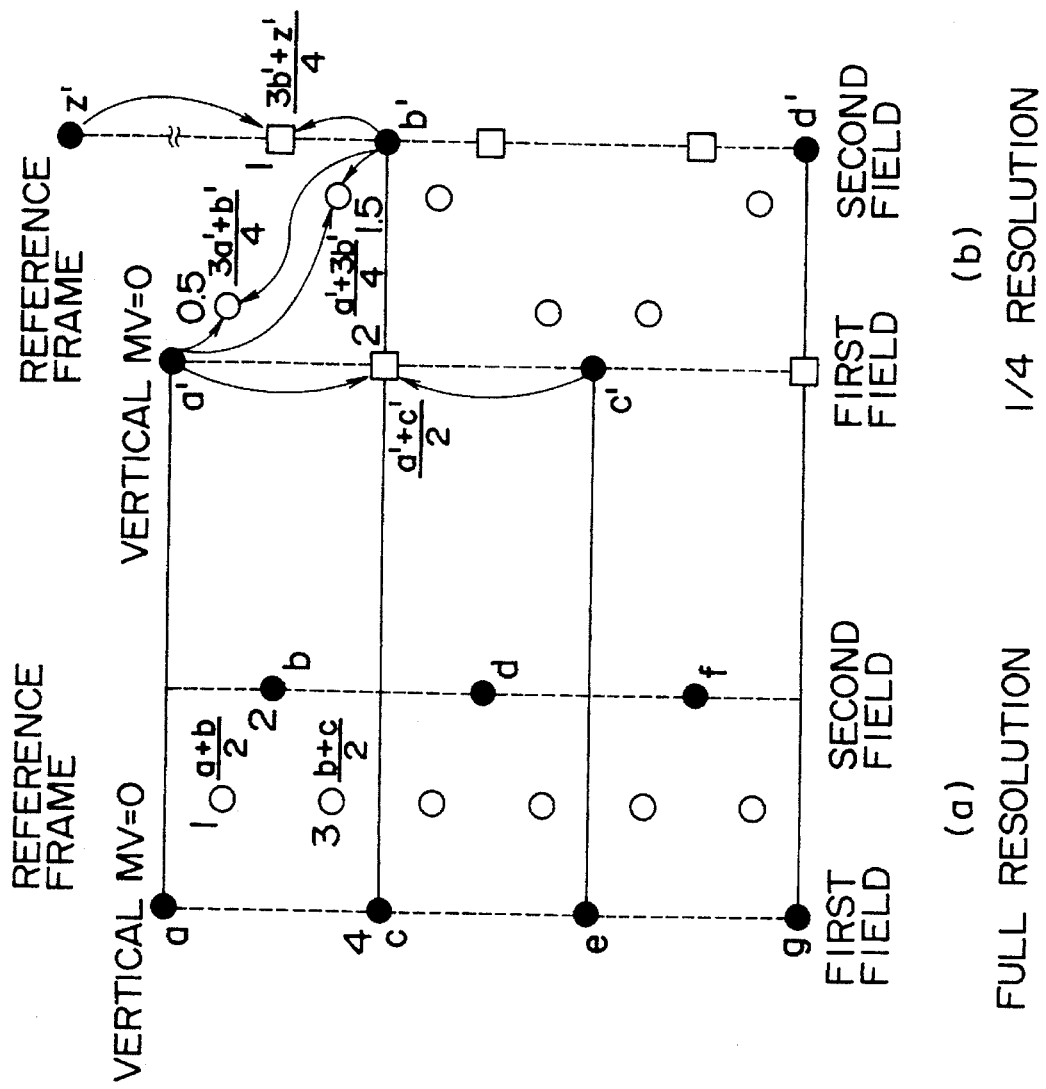

In the second frame predictive mode illustrated in FIG. 10, the predictive picture elements for the high resolution signal are produced in the same manner as in the first frame predictive mode of FIG. 8. As to the low resolution signal, again the predictive pixel elements are produced in the same manner as in the first predictive mode of FIG. 8 except when the value of the motion vector is 4 (i.e., when the value of the scaled motion vector output by the scaling circuit 87 is 2). In this case, rather than producing the original picture element b', an interpolated picture element (a'+c')/2 is produced, which has the same field parity as the corresponding picture element c of the full resolution signal. In other words, according to this second frame predictive mode, the picture element b' is not used as a predictive picture element itself, but is used only for interpolation in forming other predictive picture elements.

Figure 11:
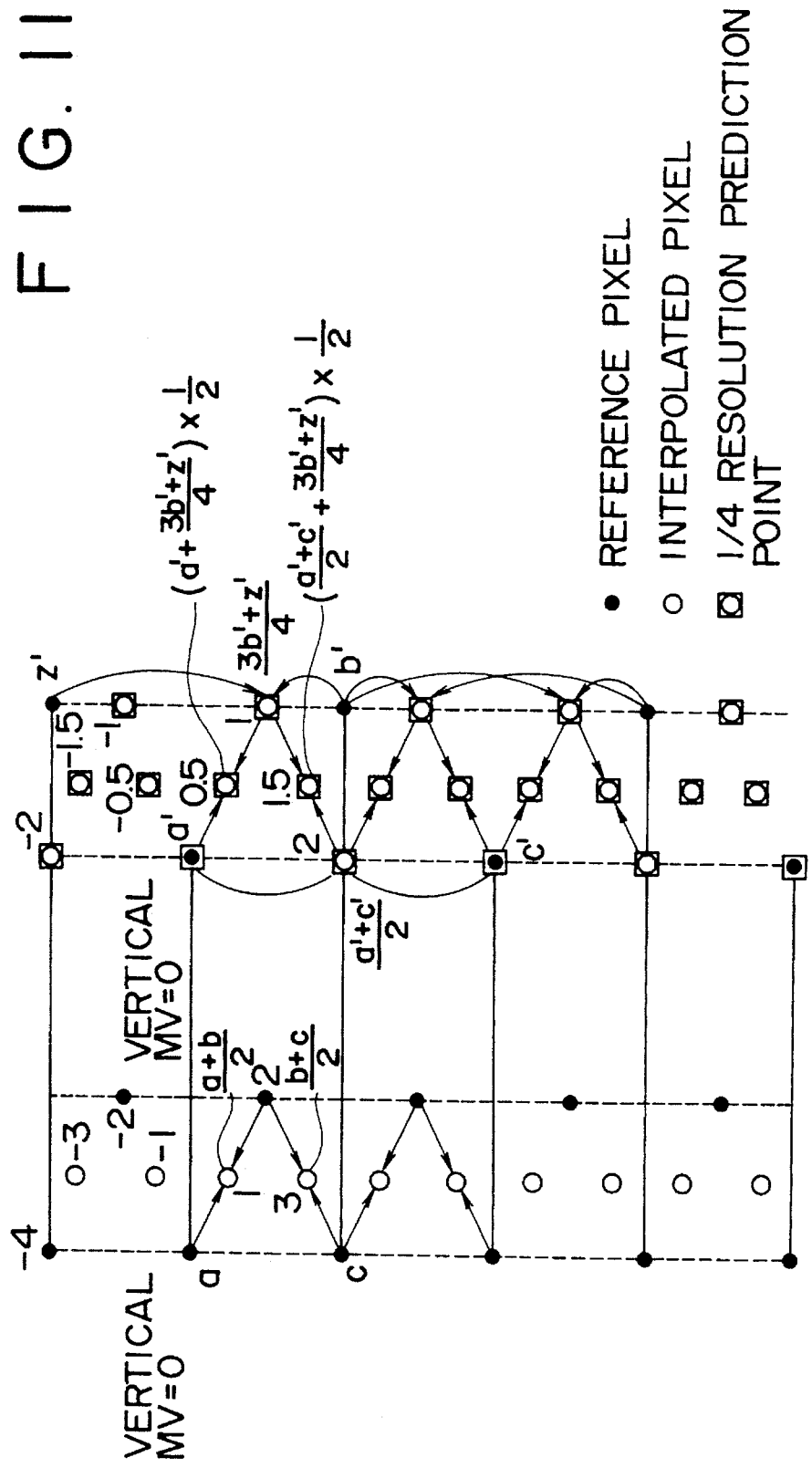

A third frame predictive mode, different from the first and second frame predictive modes referred to above, will now be described with reference to FIG. 11. The third frame predictive mode illustrated in FIG. 11 is the same as the second frame predictive mode of FIG. 10, except with respect to the production of the predictive picture element for the low resolution signal when the motion vector has the value 1 or 3 (corresponding to the values 0.5 and 1.5 of the scaled motion vector output by the scaling circuit 87). In these two cases, the respective predictive picture elements are produced as $(\frac{1}{2})(a'+(3b'+z')/4)$ and $(\frac{1}{2})((a'+c')/2+(3b'+z')/4)$, respectively. That is, in the first case the predictive picture element is interpolated from the picture elements a' and $(3b'+z')/4$ and in the second case the predictive picture element is interpolated from the picture elements $(a'+c')/2$ and $(3b'+z')/4$.

When motion compensation is performed in this manner, so that the low resolution predictive picture elements coincide in field parity and position with the corresponding predictive picture elements for the full resolution signal, mismatch errors arising from displacement between the encoder predictive picture and the low resolution decoder prediction picture are reduced, which minimizes the loss of interlace structure in the low resolution picture and promotes smooth motion therein.

Operation of the selection circuit 82 of FIG. 7 will now be described.

An 8×8 block of coefficient data (as shown in FIG. 4) output from dequantization circuit 81 (FIG. 6) is stored in the memory 92 of the selection circuit 82. If the predictive flag signal provided by the variable length decoding circuit 71 indicates the frame DCT mode, then the address control circuit 91 (FIG. 7) causes a 4×4 subblock of coefficient data from the left upper corner of the 8×8 data block to be read out along with the first four elements from the last row of the 8×8 data block. The read-out data is provided to the arithmetic unit 90. The arithmetic unit 90 respectively adds the four data elements d(7,0), d(7,1), d(7,2) and d(7,3) from the eighth row to the four data elements d(3,0), d(3,1), d(3,2) and d(3,3) from the fourth row. As a result, the 4×4 subblock of coefficients as shown in FIG. 12 is initially read out and then is changed to form a modified 4×4 subblock as shown in FIG. 13. In particular, the coefficient data elements in the first three rows of FIG. 13 are the same as those of FIG. 12, but the data elements in the last row of FIG. 13 are d(3,0)+d(7,0), d(3,1)+d(7,1), d(3,2)+ d(7,2) and d(3,3)+d(7,3). The data elements of the modified subblock of FIG. 13 are written into the memory 92. (It will be noted that the 4×4 subblock of FIG. 12 is the intersection of the first four rows and the first four columns of the 8×8 block of FIG. 4.)

The first four elements of the last row of the data block of FIG. 4 correspond to high frequency components arising from motion between the two interlaced fields of the same frame of the high definition video signal. Since these four data elements are added to corresponding elements in the fourth row which correspond to the highest frequency components in the low frequency region of the 4×4 subblock, the modified subblock of FIG. 13 includes information representing the interlace structure. Accordingly, when the modified subblock of FIG. 13 is supplied from the memory 92 to the IDCT circuit 83, and an IDCT is performed thereon, the loss of interlace structure caused by use of the unmodified 4×4 data block of FIG. 12 is avoided. As a result, the reproduced low resolution picture exhibits smooth motion rather then the unnatural motion which occurs due to the loss of interlace structure.

While high frequency components arising from interlacing are contained in and around the last row of the 8×8 DCT coefficient data block in the frame DCT mode, those components are not present in the 8×8 data block in the field DCT mode. Accordingly, the IDCT is performed on the modified subblock of FIG. 13 in the frame DCT mode but is performed on the unmodified subblock of FIG. 12 in the field DCT mode.

FIG. 14 shows another way in which the selection circuit 82 may be operated in the frame DCT mode. In this case, the arithmetic unit 90 calculates a sum D3 formed by adding the absolute values of the 8 data elements d(3,0) to d(3,7) making up the fourth row of the data block of FIG. 4, and also calculates a sum D7 formed by adding the absolute values of the 8 data elements d(7,0) to d(7,7) making up the eighth row of the data block. Then the arithmetic unit 90 compares the sums D3 and D7, and, if the sum D3 is greater than the sum D7, it selects the data elements d(3,0) to d(3,3) to be the four data elements of the fourth row of the 4×4 subblock of coefficients, but if the sum D7 is greater than the sum D3, then the data elements d(7,0) to d(7,3) are selected to make up the fourth row of the subblock. (It will be noted that these four elements d(7,0) to d(7,3) are the intersection of the first four columns and the last row of the 8×8 block.) FIG. 14 illustrates the latter case.

In particular, if the sum D3 is greater than the sum D7, that indicates that there is little or no motion between two interlaced fields of the frame. In that case, the data elements d(3,0) to d(3,3) corresponding to low frequency components are selected instead of the data elements d(7,0) to d(7,3), which correspond to high frequency components. But if the sum D7 is greater than the sum D3, this indicates that there is a comparatively large amount of motion between the two fields so that the data d(7,0) to d(7,3) corresponding to higher frequency components are selected.

FIG. 15 shows still another way in which selection circuit 82 may operate. In this case, if the sum D3 is greater than the sum D7 then the unmodified subblock of FIG. 12 is selected for IDCT processing. However, if the sum D7 is greater than the sum D3, the first four data elements in each of the seventh and eighth rows of the 8×8 data block of FIG. 4 are selected to replace the last two rows of the 4×4 subblock of FIG. 12, resulting in a modified subblock as shown in FIG. 15. This way of operating selection circuit 82 provides a larger quantity of higher frequency components than the manner of operation shown in FIG. 14.

It should also be noted that if the frame predictive mode is indicated by the predictive flag signal supplied by the variable length decoding circuit 71 and the sum D3 is found by selection circuit 82 to be greater than the sum D7, then motion compensation may be performed in accordance with the first frame predictive mode described with respect to FIG. 8 above, but if the sum D7 is found to be greater than the sum D3, then motion compensation is performed in the second frame predictive mode described with the respect to FIG. 10 above. This is because, when the sum D3 is greater then the sum D7, the picture exhibits only a small amount of motion between the interlaced fields of the frame so that the picture element b' is approximately the same as a picture element obtained by interpolation as (a'+c')/2, and a sufficiently accurate predictive picture element can be provided even without producing the interpolated picture element.

There will now be described a method of zigzag scanning to facilitate the operations described above with respect to FIGS. 13–15. Although it is possible to carry out those operations using the zigzag scanning pattern shown in FIG. 5, greater efficiency can be achieved using the zigzag scanning pattern shown in FIG. 16.

Referring now to FIG. 16, it is noted that zigzag scanning is first performed within the upper left quadrant of the 8×8 block of coefficients. More specifically, first the coefficient at square number 1 in the upper left corner is transmitted, and then the scan moves to the right so that the coefficient at square 2 is transmitted next. Then the scan moves obliquely downward to the left for transmission of the coefficient in position number 3. Next the scan moves down to the coefficient in position number 4, followed by a move obliquely upward to the right so that the coefficient at position number 5 is transmitted next. Zigzag scanning continues with respect to the 16 coefficients in the upper left quadrant. After that, the next four coefficients to be transmitted, numbers 17–20, are the first four coefficients in the eighth row of the 8×8block. The next four elements to be transmitted are the first four elements of the seventh row. After these 24 coefficients have been transmitted, in the manner just described, the scanning point advances to the coefficient at location number 25 (the first element in the fifth row), and zigzag scanning then resumes to accomplish transmission of all coefficients that have not previously been transmitted.

Figure 17:
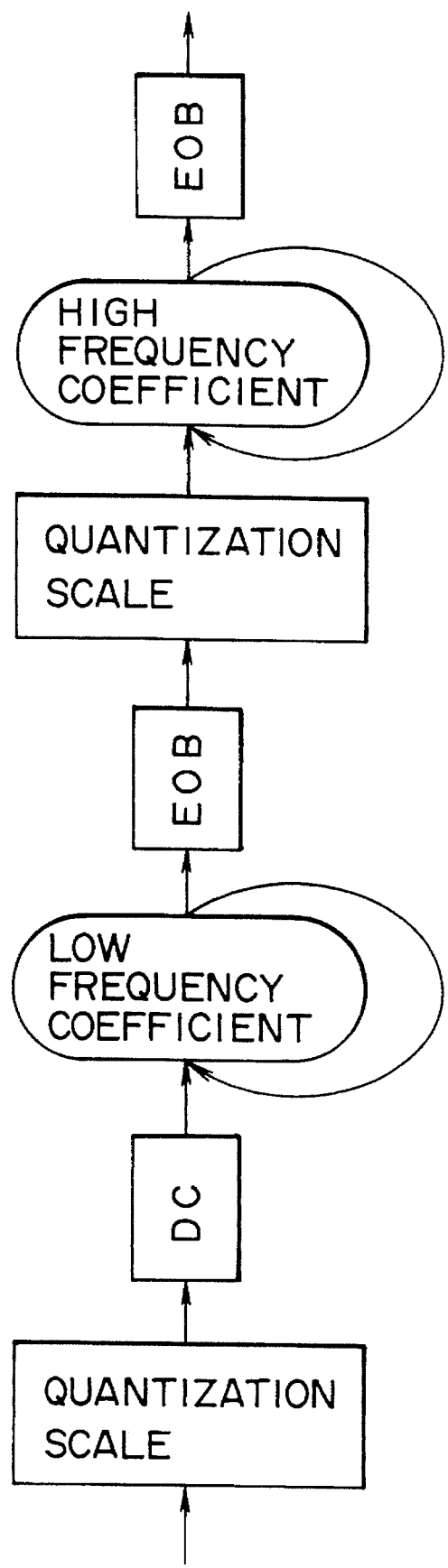
FIG. 17 schematically illustrates transmission of the data in accordance with the zigzag scanning method shown in FIG. 16.

A format for transmission of the coefficient data elements with zigzag scanning according to the invention is diagrammatically illustrated in FIG. 17. Referring to FIG. 17, and reading upwardly from the bottom of that drawing, first a signal representing a quantization scale is transmitted, followed by a DCT coefficient located at position number 1 in FIG. 16 and representing a DC component. Next the DCT coefficients representing relatively low frequency components and located at the positions 2–24 in FIG. 16 are successively transmitted in the order described above. Then, an end-of-block signal indicating the end of a block is sent out. Following that signal, a signal representing a dequantization scale is again sent out (it is to be noted that the first quantization scale signal indicates the quantization step to be used until the first end-of-block signal while the second quantization scale signal indicates a different quantization step to be used for the later-transmitted coefficients).

Following the second quantization scale signal, the remaining coefficients located in positions 25 to 64 of FIG. 16 are successively transmitted in the order of the location numbers. Finally, after the 64th coefficient is transmitted, another end-of-block signal is transmitted. The end-of-block signals are generated by an EOB generator 58a that is part of the variable length coding circuit 58 of FIG. 1.

When the coefficient data are transmitted in the manner just described, the selection circuit 82 of the decoder shown in FIG. 6 operates so that it ignores the coefficients transmitted after the first end-of-block signal and before the second end-of-block signal and then commences processing again starting with the first coefficient transmitted after the second end-of-block signal. On the other hand, in the decoding performed for the HDTV signal, the IDCT circuit 73 ignores the first end-of-block signal and detects only the second end-of-block signal as indicating the end of the data block.

Figure 18A:
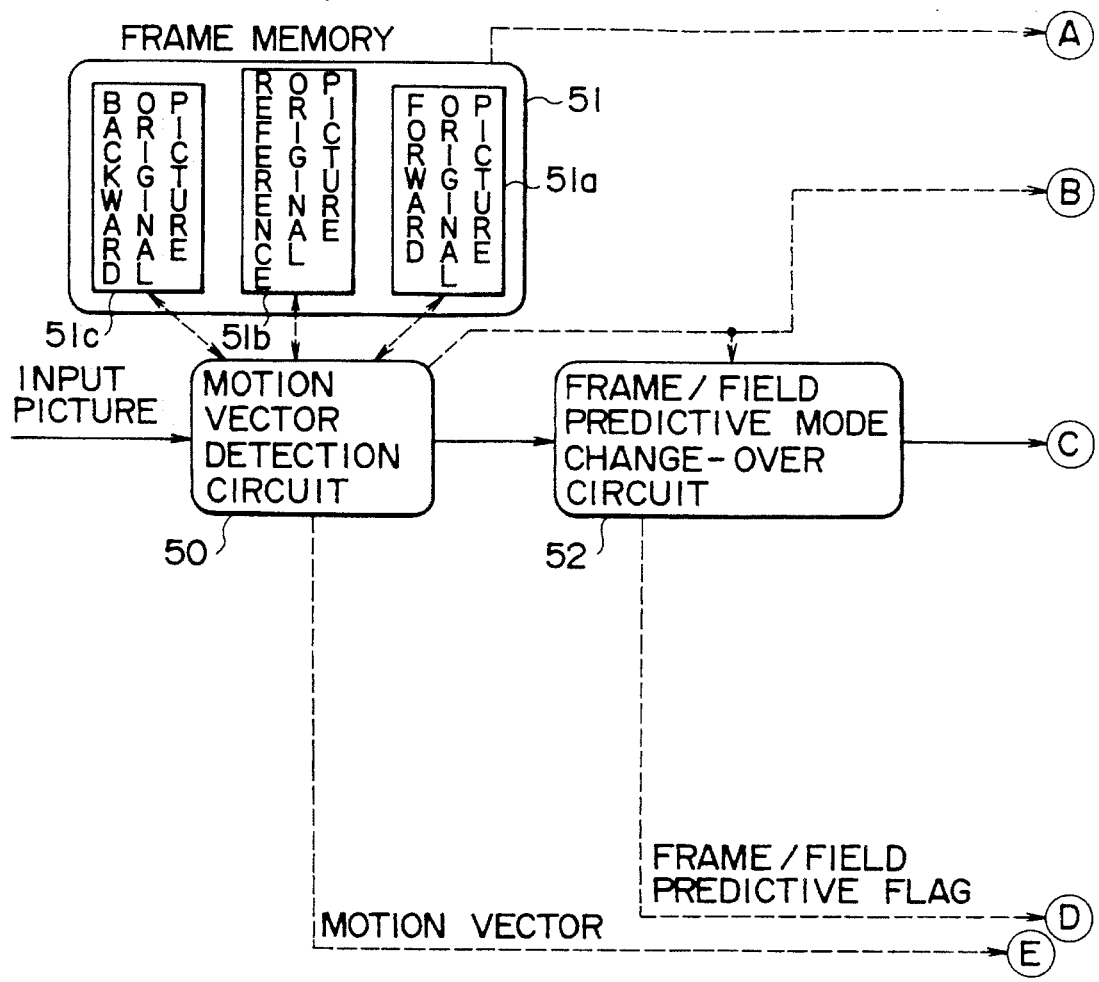
FIGS. 18 and 18(A)–18(C) together form a block diagram of another embodiment of an image signal coding apparatus in which the present invention is applied.
Figure 18:
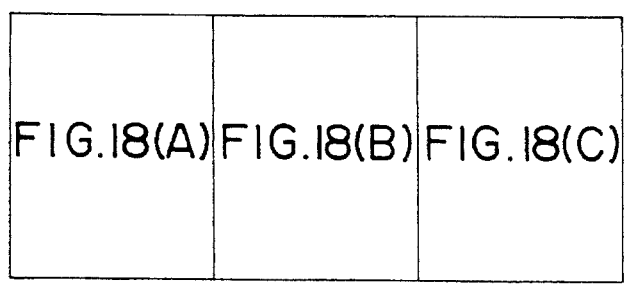
Figure 18B:
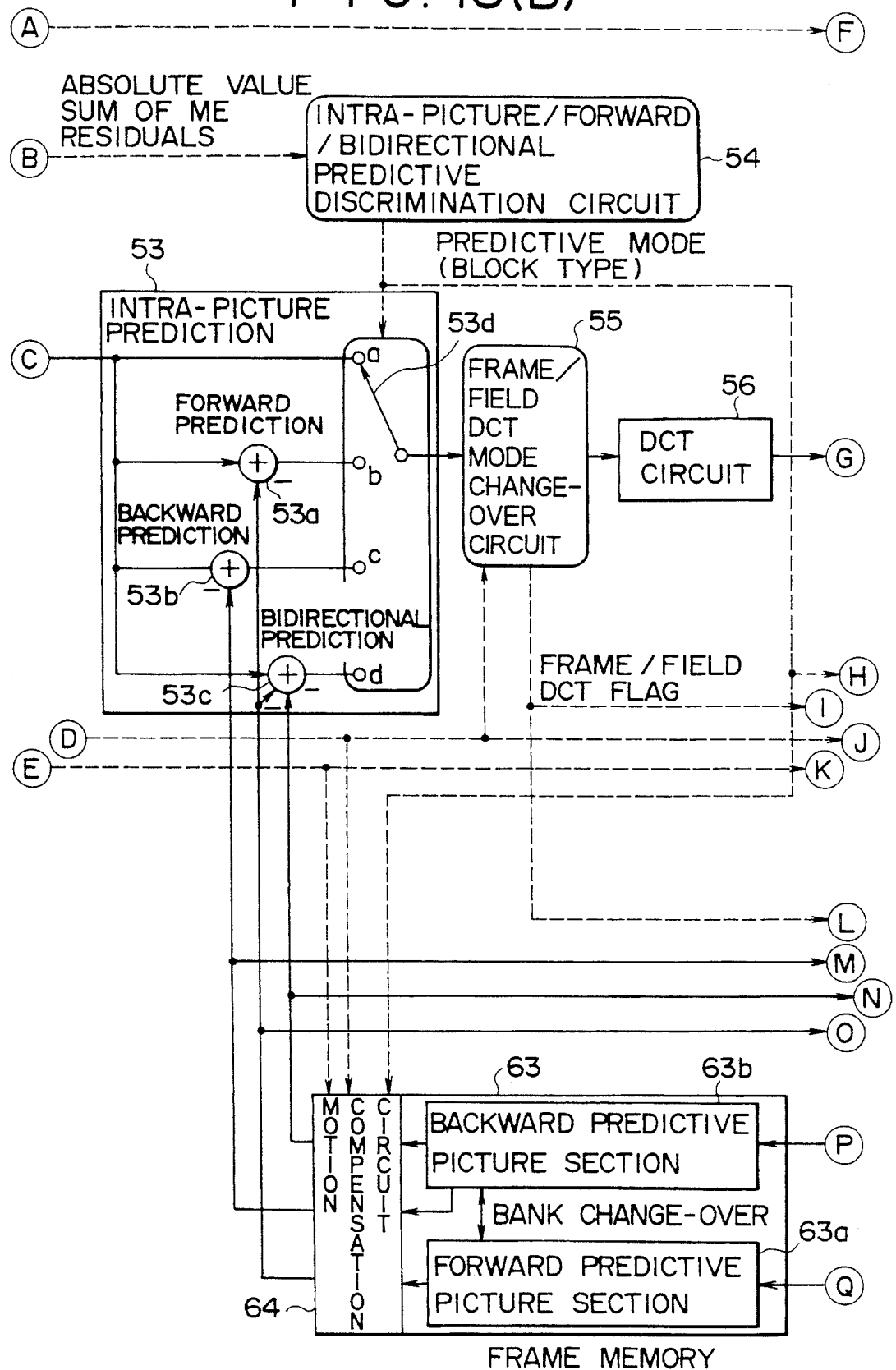
Figure 18C:
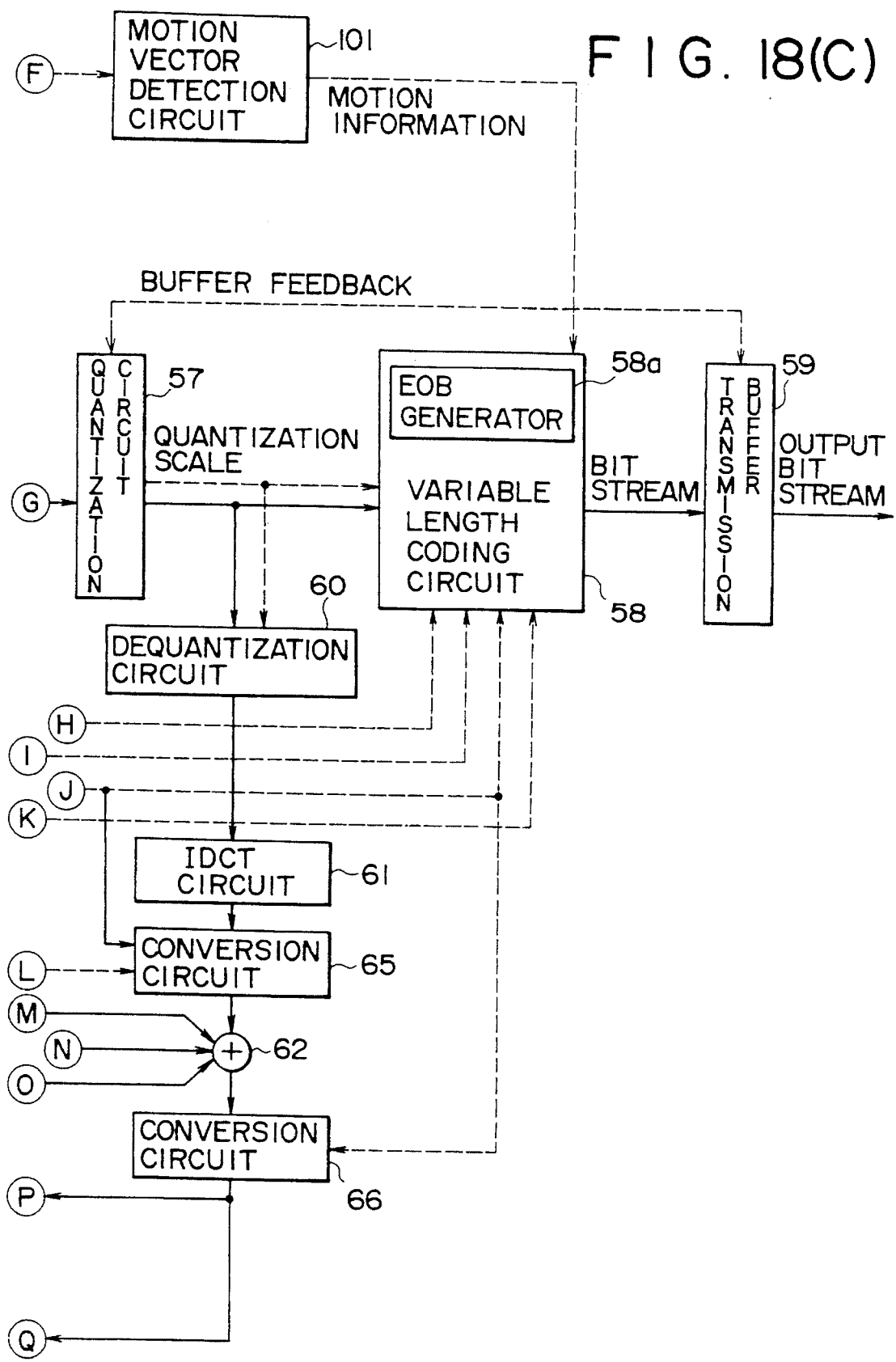

In the foregoing description, the decoder of FIG. 6 selected from among the methods of processing discussed with respect to FIGS. 12–15 on the basis of the received coefficient data. However, it is also possible to have an instruction for selecting the method of processing originate from the encoder. FIGS. 18 and 19 respectively illustrate an encoder and a decoder arranged for this purpose. In particular, FIG. 18 includes a motion vector detection circuit 101 (which may be incorporated in motion vector detection circuit 50) which detects the motion vector for a block of image data between two fields of one frame of image data stored in frame memory 51. The motion is detected between fields of one frame, rather then between frames, because it is intended to detect motion between interlaced fields of a single frame. The resulting motion vector signal (or motion information signal) provided by the motion vector detection circuit 101 is supplied to the variable length coding circuit 58 for inclusion in the bit stream to be transmitted. The motion information signal may consist of one or two bits.

Figure 20:
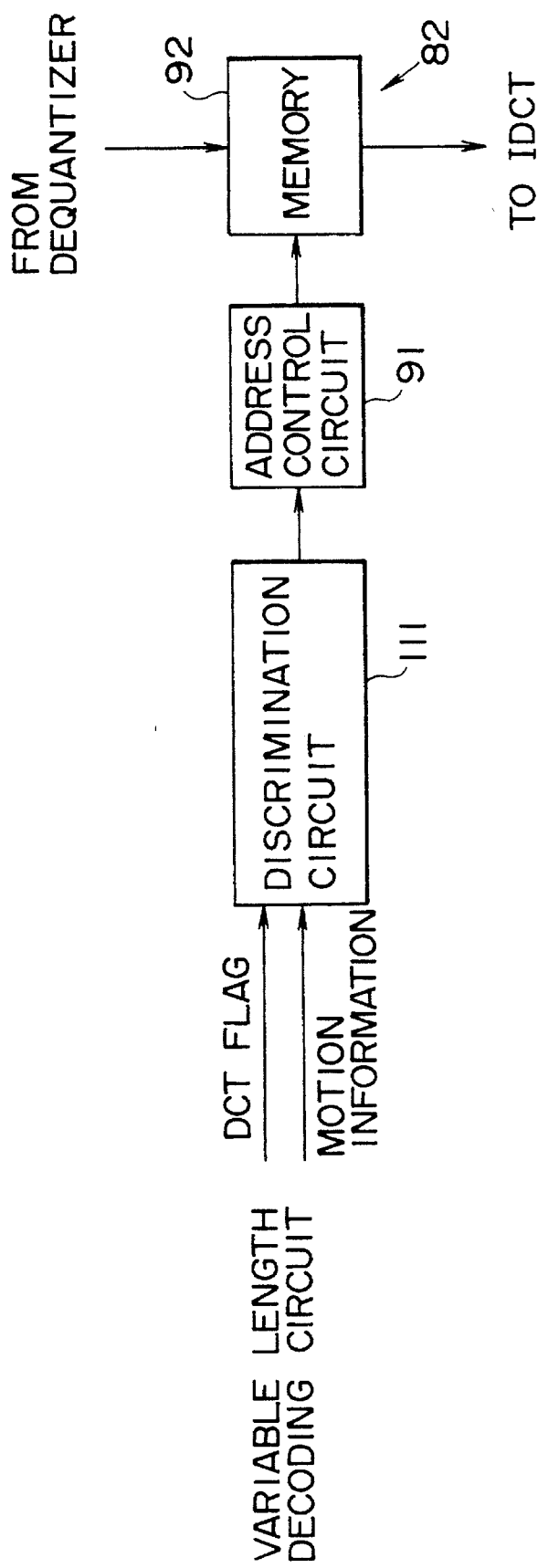
FIG. 20 is a block diagram of a selection circuit that is part of the image signal decoding apparatus of FIG. 19.

In the decoder shown in FIG. 19, the motion information signal is detected at the variable length decoding circuit 71 and is used to control operation of selection circuit 82. The selection circuit 82 included in the decoder of FIG. 19 is shown in block diagram form in FIG. 20. Referring to FIG. 20, the motion information signal received from variable length decoding circuit 71 is detected by a detection circuit 111 and the operations of the address control circuit 91 are controlled in accordance with the result of the detection.

Thus, if the selection circuit 82 is to have two manners of processing, then the motion information signal consists of one bit and any two of the methods of processing illustrated in FIGS. 12 through 15 can be selectively performed in response to the motion information signal.

Moreover, if the motion information signal consists of two bits, then four different methods of operation can be selected in the selection circuit 82. That is, motion can be divided into four categories including no motion, a small degree of motion, a moderate degree of motion, and a large degree of motion. When the degree of motion is large, the method of operation shown in FIG. 15 can be carried out; when the degree of motion is moderate, the operation shown in FIG. 14 can be carried out; when the degree of motion is small, the operation shown in FIG. 13 can be carried out; and when there is no motion, the operation shown in FIG. 12 can be carried out.

In the foregoing description, the fourth row, or the third and fourth rows, of the 4×4 subblock of FIG. 12 were replaced by corresponding elements from the eighth row, or from the seventh and eighth rows, of the 8×8 block. Alternatively, fewer than all elements of a row, such as only one coefficient data element of a row, may be replaced. As another alternative, three of the four rows of the 4×4 subblock may be replaced.

Moreover, although replacement of a row or rows of the subblock were described above, alternatively, a column or columns of the data elements of the subblock may be replaced. Still further, although data compression using the discrete cosine transform was described above, the present invention may also be applied with any other orthogonal transformation.

Still further, in the foregoing description, the entire 8×8 block of quantized data supplied from the quantization circuit 57 is variable-length-encoded and transmitted and, at the decoder, when a standard television picture is to be obtained, only the quantized data in the upper left quadrant are separated from the quantized data for the entire 8×8 data block. Alternatively, however, the encoder may variable-length-encode the quantized data for the low frequency components in the upper left quadrant separately from the balance of the quantized data for the 8×8 block. Then, at the decoder, only the quantized data for the low frequency components are decoded to provide the low resolution picture, but when the higher resolution picture is to be provided, both the lower frequency component data and the remaining data for the block are variable-length-decoded.

As described above, according to the present invention the coefficient data that are subjected to the inverse orthogonal transformation include coefficient data from outside of the usual limited range used for obtaining the lower resolution picture. Also, motion compensation is performed in response to a predictive flag signal in such a manner that the positions and field parities of predictive picture elements obtained by motion compensation in the low resolution section on the decoder side coincide with those of predictive picture elements obtained by motion compensation on the encoder side. As a result, the loss of interlace structure and disturbance of smooth motion that would otherwise be experienced is minimized or eliminated.

Having described specific preferred embodiments of the present invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A method of decoding image data in the form of a block of coefficient data elements produced by performing an orthogonal transformation upon a block of picture element data, comprising the steps of:

forming from said block of coefficient data elements a first subblock having a smaller range than said block;

forming a modified subblock by replacing at least one element of said first subblock with a corresponding at least one element of said block from outside of said first subblock; and performing an inverse orthogonal transformation on said modified subblock to produce reconstituted picture element data.

2. A method of decoding image data according to claim 1, wherein said block of coefficient data elements represents coefficient data elements arrayed in m rows and n columns, and said first subblock represents an intersection of a first j rows and a first k columns of said block of coefficient data elements, j being less than m, k being less than n; and said step of forming said modified subblock includes replacing a last j row of elements of said first subblock with corresponding elements of a last m row of said block, j, k, m, and n being positive integers.

3. A method of decoding image data according to claim 1, wherein said orthogonal transformation is a discrete cosine transform and said inverse orthogonal transformation is an inverse discrete cosine transform.

4. A method of decoding image data according to claim 1, wherein said block of picture element data is produced from a frame of picture element data consisting of two interlaced fields, said coefficient data elements having been produced on the basis of differences between reference picture data and encoding predictive picture data generated with motion compensation in one of a frame predictive mode and a field predictive mode; and further comprising the steps of:

generating decoding predictive picture data using motion compensation in said one of said predictive modes; and combining said reconstituted picture element data and said decoding predictive picture data.

5. A method of decoding image data according to claim 4, wherein said decoding predictive picture data includes picture elements that correspond to picture elements of said encoding predictive picture data.

6. A method of decoding image data according to claim 4, wherein positions of picture elements of said decoding predictive picture data coincide with positions of corresponding picture elements of said encoding predictive picture data, if said one of said predictive modes is said field predictive mode.

7. A method of decoding image data according to claim 4, wherein a field parity of picture elements of said decoding predictive picture data coincides with a field parity of corresponding picture elements of said encoding predictive picture data, if said one of said predictive modes is said frame predictive mode.

8. A method of decoding image data according to claim 7, wherein picture elements of said decoding predictive picture data are formed by interpolation if corresponding picture elements of said encoding predictive picture data were formed by interpolation.

9. A method of decoding image data in the form of a block of coefficient data elements produced by performing an orthogonal transformation upon a block of picture element data, comprising the steps of:

forming from said block of coefficient data elements a first subblock having a smaller range than said block;

forming a modified subblock by replacing at least one element of said first subblock with a sum of said at least one element and a corresponding at least one element of said block from outside of said first subblock; and performing an inverse orthogonal transformation on said modified subblock to produce reconstituted picture element data.

10. A method of decoding image data according to claim 9, wherein said orthogonal transformation is a discrete cosine transform and said inverse orthogonal transformation is an inverse discrete cosine transform.

11. A method of decoding image data according to claim 9, wherein said block of picture element data is produced from a frame of picture element data consisting of two interlaced fields, said coefficient data elements having been produced on the basis of differences between reference picture data and encoding predictive picture data generated with motion compensation in one of a frame predictive mode and a field predictive mode; and further comprising the steps of:

generating decoding predictive picture data using motion compensation in said one of said predictive modes; and combining said reconstituted picture element data and said decoding predictive picture data.

12. A method of decoding image data according to claim 11, wherein said decoding predictive picture data includes picture elements that correspond to picture elements of said encoding predictive picture data.

13. A method of decoding image data according to claim 11, wherein positions of picture elements of said decoding predictive picture data coincide with positions of corresponding picture elements of said encoding predictive picture data, if said one of said predictive modes is said field predictive mode.

14. A method of decoding image data according to claim 11, wherein a field parity of picture elements of said decoding predictive picture data coincides with a field parity of corresponding picture elements of said encoding predictive picture data, if said one of said predictive modes is said frame predictive mode.

15. A method of decoding image data according to claim 14, wherein picture elements of said decoding predictive picture data are formed by interpolation if corresponding picture elements of said encoding predictive picture data were formed by interpolation.

16. A method of decoding image data in the form of a block of coefficient data elements produced by performing an orthogonal transformation upon a block of picture element data, wherein said block of coefficient data represents coefficient data elements arrayed in m rows and n columns, comprising the steps of:

forming from said block of coefficient data elements a first subblock having a smaller range than said block, said first subblock represents an intersection of the first j rows and first k columns of said block of coefficient data elements, j being less than m, k being less than n;

forming a modified subblock by replacing at least each element of the last row of said first subblock with a sum of said element and a corresponding element of the last row of said block; and performing an inverse orthogonal transformation on said modified subblock to produce reconstituted picture element data.

17. A method of decoding image data according to claim 16, wherein m=n and j=k.

18. A method of decoding image data according to claim 17, wherein m=n=8 and j=k=4.

19. An apparatus for decoding a block of image data that was generated by performing an orthogonal transformation upon a block of picture element data from a frame of picture elements consisting of two interlaced fields, said orthogonal transformation producing a block of coefficient data elements representing coefficient data elements arrayed in m rows and n columns, and then quantizing and variable-length-encoding said block of coefficient data elements; the apparatus comprising:

variable length decoding means for performing variable length decoding upon said image data to form decoded data;

dequantization means for dequantizing the decoded data to recover said block of coefficient data elements;

subblock forming means for forming a j row by k column subblock from said recovered block of coefficient data elements, j being less than m, k being less than n, the first j-1 rows of said subblock being formed as an intersection of the first j-1 rows and first k columns of said recovered block of coefficient data elements, each element of the jth row of said subblock being formed as the sum of respective corresponding elements of the jth and mth rows of said recovered block of coefficient data elements; and inverse orthogonal transformation means for performing an inverse orthogonal transformation upon said subblock.

20. An apparatus according to claim 19, wherein m=n and j=k, with j, k, m, and n being positive integers.

21. An apparatus according to claim 19, wherein said orthogonal transformation is a discrete cosine transform and said inverse orthogonal transformation is an inverse discrete cosine transform.

* * * * *